US010860266B2

(12) United States Patent
Roberts et al.

(10) Patent No.: US 10,860,266 B2
(45) Date of Patent: Dec. 8, 2020

(54) SYSTEMS AND METHODS FOR CREATING TEMPLATES FOR EFFICIENTLY GENERATING AND PRODUCING CUSTOMIZED VERSIONS OF VARIABLE PRINT PRODUCTS

(71) Applicant: INNERWORKINGS, INC., Chicago, IL (US)

(72) Inventors: Brian Roberts, Aurora, IL (US); Mark Hilger, Chicago, IL (US); Robert Burkart, Hindsdale, IL (US); Timcy Chacko, Mount Prospect, IL (US)

(73) Assignee: INNERWORKINGS, INC., Chicago, IL (US)

( * ) Notice: Subject to any disclaimer, the term of this patent is extended or adjusted under 35 U.S.C. 154(b) by 0 days.

(21) Appl. No.: 16/431,204

(22) Filed: Jun. 4, 2019

(65) Prior Publication Data

US 2020/0097234 A1 Mar. 26, 2020

Related U.S. Application Data

(63) Continuation of application No. 15/723,027, filed on Oct. 2, 2017, now Pat. No. 10,310,785.
(Continued)

(51) Int. Cl.
*G06F 3/12* (2006.01)

(52) U.S. Cl.
CPC .......... *G06F 3/1243* (2013.01); *G06F 3/1204* (2013.01); *G06F 3/1208* (2013.01); *G06F 3/1257* (2013.01); *G06F 3/1292* (2013.01)

(58) Field of Classification Search
CPC .................................................. G06F 3/1243
See application file for complete search history.

(56) References Cited

U.S. PATENT DOCUMENTS 7,207,009 B1 * 4/2007 Aamodt ................. G06Q 40/00
715/772
7,606,721 B1 ‡ 10/2009 Donnelly .............. G06F 19/328
705/2
(Continued)

OTHER PUBLICATIONS

Roberts, Office Action, U.S. Appl. No. 15/723,027, dated Nov. 8, 2018, 16 pgs.
(Continued)

*Primary Examiner* — King Y Poon
*Assistant Examiner* — Michael Burleson
(74) *Attorney, Agent, or Firm* — Morgan, Lewis & Bockius LLP

(57) ABSTRACT

A system receives a request to create a template. Responsive to the request, the system displays a user interface including at least a preview and configuration region, and a template variables region. While displaying the user interface, the system receives user input that selects a respective variable for inclusion in the template. Responsive to the user input, the system updates the configurable preview of the template to include the respective variable, and displays user interface elements used to define input-acceptance rules for the respective variable. The system receives user input at the user interface elements to define an input-acceptance rule having at least one condition that must be satisfied before input will be accepted via the respective variable when that respective variable is used in conjunction with the template. Responsive to the user input at the user interface elements, the system associates the respective variable with the input-acceptance rule.

28 Claims, 27 Drawing Sheets

Related U.S. Application Data

(60) Provisional application No. 62/402,945, filed on Sep. 30, 2016.

(56) References Cited

U.S. PATENT DOCUMENTS

| | | | | |
|---|---|---|---|---|
| 8,990,321 | B1* | 3/2015 | Korn | H04L 51/066 709/206 |
| 2006/0028659 | A1* | 2/2006 | Nishikawa | G06K 15/02 358/1.2 |
| 2006/0136307 | A1* | 6/2006 | Hays | G06F 40/186 705/26.1 |
| 2007/0285720 | A1* | 12/2007 | Guglielmi | H04N 1/00132 358/1.18 |
| 2009/0251386 | A1‡ | 10/2009 | Ikeda | G06F 3/147 345/30 |
| 2010/0257446 | A1* | 10/2010 | Woolfe | G06F 3/1204 715/274 |
| 2010/0296122 | A1‡ | 11/2010 | Mitsui | G06F 3/1204 358/1.15 |
| 2012/0313926 | A1‡ | 12/2012 | Rolleston | G06T 15/00 345/419 |
| 2014/0347687 | A1* | 11/2014 | Jintsugawa | G06K 15/024 358/1.13 |

OTHER PUBLICATIONS

Roberts, Notice of Allowance, U.S. Appl. No. 15/723,027, dated Mar. 1, 2019, 8 pgs.

\* cited by examiner
‡ imported from a related application

| Template ID | Element Name | Element Type | Options | Input-Acceptance Rule? | Access Level Required | Quick Fill |
|---|---|---|---|---|---|---|
| 1 | Appetizer1 Price | Dropdown | {1.99, 2.99, 3.99} | Value < 5 | No | 2.99 |
| 1 | Appetizer1 Image | Image | Pointer to img library | NULL | Admin | Pointer to img1 |
| 2 | Entree1 | Text | {Pan, Deep Dish} | NULL | No | Pan |
| ... | ... | ... | ... | ... | ... | ... |

Variable Print Product Templates 322-1

Header 410-0
Record 410-1
Record 410-2
Record 410-3
Record 410-N

| Template Custom Labels | X |
|---|---|
| Page Break Next Button | Next |
| Page Break Back Button | Back |
| Image Upload Button | Upload |
| Image Library Button | Select |
| Required Text Warning | Missing required information |
| Low DPI Warning | Image does not meet minimu |
| Wrong Dimensions Warning | Image does not meet minimu |
| Not an Image Warning | Uploaded File is not an image |
| Download Image Error | Error while retrieving image |
| Save Image Error | Error while saving image |
| Warning Message Title | Warning |
| Drop Down Default | --Please Select-- |
| File does not exist error | File does not exist anymore. Tr |

Figure 7AC

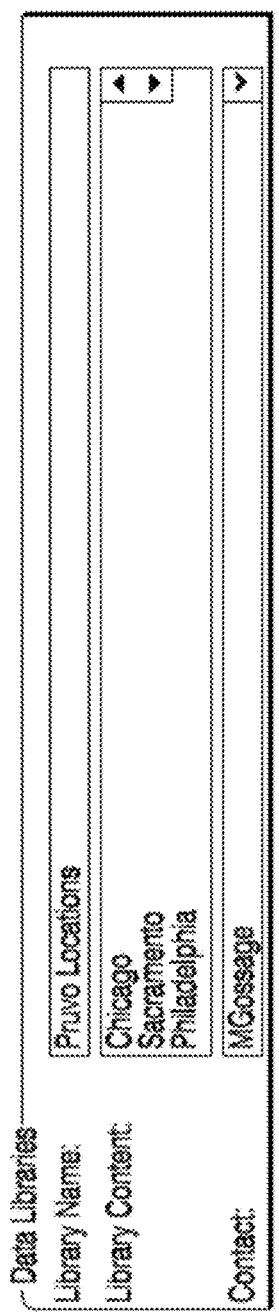
Figure 7AG
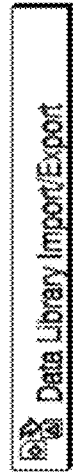
Figure 7AH
| | A | B | C |
|---|---|---|---|
| 1 | UserName | Library Name | Library Content |
| 2 | wcrane@pruvo.com | Pruvo Locations | Chicago; Atlanta; Sacramento |
Figure 7AI

SYSTEMS AND METHODS FOR CREATING TEMPLATES FOR EFFICIENTLY GENERATING AND PRODUCING CUSTOMIZED VERSIONS OF VARIABLE PRINT PRODUCTS

RELATED APPLICATION

This application is a continuation of U.S. patent application Ser. No. 15/723,027, filed on Oct. 2, 2017, entitled "Systems and Methods for Efficiently Rendering and Producing Customized Versions of Variable Print Products," which claims priority to U.S. Provisional Patent Application No. 62/402,945, filed Sep. 30, 2016, "Systems and Methods for Efficiently Rendering and Producing Customized Versions of Variable Print Products," each of which is herein fully incorporated by reference in its respective entirety.

TECHNICAL FIELD

The disclosed embodiments relate generally to rendering and printing physical print products and, in particular, to systems and methods for receiving minimal user inputs to render and produce customized versions of variable print products.

BACKGROUND

Some print procurement systems allow suppliers of printing services to connect with consumers of printing services. In certain circumstances, a consumer may create an initial version of a print product and then realize that additional changes are needed to that print product or may realize that a new print product is required that shares many similarities with the initial version of the print product (e.g., to update a printed menu to reflect changes to available food selections for a particular day). Typically, the consumer must re-create the entire print product from scratch or go through a burdensome and inefficient process for re-inputting all information and specifications for the print product, in order to implement the additional changes and/or create the new print product. There is a need, therefore, for print procurement systems that allow consumers to easily modify a print product (e.g., using a minimal number of user inputs), without requiring those consumers to resort to inefficient, time-consuming processes.

SUMMARY

Without limiting the scope of the appended claims, after considering this disclosure, and particularly after considering the section entitled "Description of Embodiments," one will understand how the aspects of various embodiments are implemented and used to address the above deficiencies and other problems associated with print procurement systems.

Some embodiments allow for creating complex templates (e.g., for creating variable print products such as menus or coupons for franchise entities) that may be used to quickly and easily create many different versions of a particular variable print product. In this way, many different franchisees are able to input their own values to a controller form template and thereby produce franchisee-specific menus, while the corporate owner is still able to ensure that certain characteristics are common to all menus (e.g., prices stay within certain ranges, consistent typefaces are utilized, stock images of food items are consistent, etc.). The franchisees are thereby also able to produce their customized menus by providing a minimal number of user inputs as they are able to take advantage of the templates.

(A1) More specifically, some embodiments include a method that is performed at an electronic device (e.g., one or more of the user computing devices 102, FIG. 1) with one or more processors and memory. The electronic device may include a display (e.g., such as a touch-sensitive display) and/or may be in communication with a display (e.g., an external monitor). The method includes: detecting, at the electronic device, a request to create a variable print product that is rendered at least in part by using user-provided values for a plurality of predefined elements (e.g., the predefined elements are associated with a predefined template form is created using an administrative application (as discussed in reference to FIGS. 5B-5C below)). In some embodiments, each of the predefined form-create elements is defined during a form creation process. In response to detecting the request, the method includes displaying a user interface with: (i) a preview region that includes a preview of the variable print product and (ii) an editing region that includes a subset of the plurality of predefined elements, the subset including a first element. While displaying the user interface, the method includes: detecting, at the electronic device, user input that provides a value for the first element. The method also includes: in accordance with a determination that the first element is associated with an input-acceptance rule, determining whether the user input (or the value for the first element) satisfies the input-acceptance rule; and in accordance with a determination that the user input satisfies the input-acceptance rule, accepting the value as a user-defined value for the first element and updating the preview of the variable print product based to include the user-defined value for the first element.

In this way, variable print products may be created more quickly and with fewer inputs from an end user, while still ensuring that certain requirements and a consistent look and feel is maintained (e.g., a restaurant franchise may create a template that allows all franchisees to quickly create various menus and the franchise is able to allow franchisees some degree of customization, while still ensuring that the requirements are met).

(A2) In accordance with some embodiments of the method of A1, displaying the preview of the variable print product includes: identifying a portion of the variable print product that corresponds to the subset of the plurality of predefined elements; and displaying, in the first region, at least the portion of the variable print product.

(A3) In accordance with some embodiments of the method of any one of A1-A2, the method includes: detecting a user input requesting to display an additional portion of the variable print product, the additional portion including data that is associated with a second element that is not a part of the subset of the plurality of predefined elements; and in response to detecting the user input requesting to display the additional portion, (i) displaying, in the preview region, the additional portion of the variable print product and (ii) displaying, in the editing region, the second element.

(A4) In accordance with some embodiments of the method of any one of A1-A3, the second element is associated with a library of stored images, and the method further includes: detecting user input at the second element; in response to detecting the user input at the second element, displaying, in the second region, an identifier for at least one stored image from the library of stored images; and detecting a selection of the identifier and, in response, updating the preview of the variable print product to include a representation of the at least one stored image.

(A5) In accordance with some embodiments of the method of any one of A1-A4, the method includes: in accordance with a determination that the user input does not satisfy the input-acceptance rule, displaying an indication that the user input does not satisfy the input-acceptance rule and continuing to display the preview of the variable print product.

(A6) In accordance with some embodiments of the method of any one of A1-A5, the user interface includes a quick-fill button that, when selected, causes displaying of the preview of the variable print product using predetermined quick-fill options for at least some of the plurality of predefined elements.

(A7) In accordance with some embodiments of the method of any one of A1-A6, the plurality of predefined elements are stored in a template that is stored at a print procurement server and that is associated with the variable print product.

(A8) In accordance with some embodiments of the method of any one of A1-A7, the user interface includes an approve button that, when selected, causes submission of the variable print product to a print procurement server for printing of the variable print product using the user-defined values for the plurality of predefined elements.

(A9) In accordance with some embodiments of the method of any one of A1-A8, the preview region is displayed adjacent to the editing region in the user interface on the display that is in communication with the electronic device.

(A10) In accordance with some embodiments of the method of any one of A1-A9, the variable print product is a restaurant menu.

(A11) In accordance with some embodiments of the method of any one of A1-A10, the plurality of predefined elements are selected from the group consisting of menu items and options for inclusion on the variable print product, pricing options for inclusion on the variable print product, and image-selection options for inclusion on the variable print product.

(A12) In some embodiments, a non-transitory computer-readable storage medium stores executable instructions that, when executed by an electronic device that is in communication with a display, cause the electronic device to perform the method described in any one of A1-A11 above.

(A13) In some embodiments, an electronic device with a display, one or more processors, and memory is provided. The memory stores one or more programs which, when executed by the one or more processors, cause the electronic device to perform the method of any one of A1-A11.

(A14) In some embodiments, a graphical user interface on an electronic device with a display is provided. The graphical user interface includes user interfaces displayed, on the display of the electronic device, in accordance with the method described in any one of A1-A11 above.

In some embodiments, a server system (e.g., a server system that includes a print procurement server) is provided and the server system is configured to perform server-side operations to enable execution of the operations described in A1-A11 above.

Thus methods, systems, electronic devices, and graphical user interfaces are provided that allow for efficiently rendering and producing customized versions of variable print products.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 7A-7H are schematics of a display used to illustrate example user interfaces for creating customized versions of variable print products, in accordance with some embodiments.

FIGS. 7I-7AI are schematics of a display used to illustrate example user interfaces used within the administrator application (e.g., such as that shown in FIGS. 5B-5C) to generate templates for print procurement products, in accordance with some embodiments.

Figure 1:
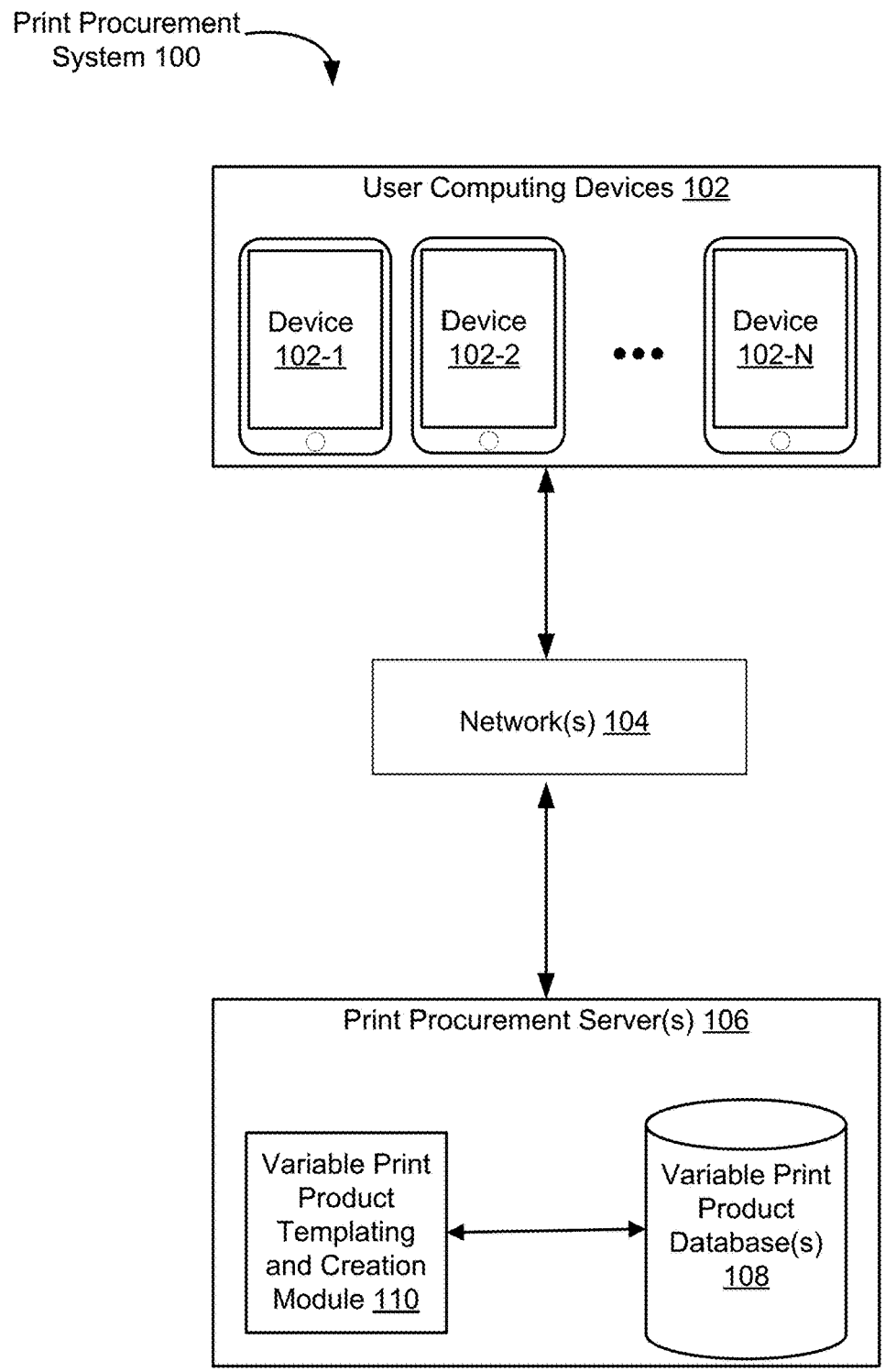
FIG. 1 illustrates an exemplary print procurement system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

Appendix A of the provisional patent application that was incorporated by reference above (U.S. Provisional Patent Application No. 62/402,945) also provides descriptions and illustrations of (i) a back-end administrative user interface and system (pages 1-6, 9-11, 14, 17, 20, 23, 26, 29-32, 35-39, 42, and 45-49) that is used to allow for the creation of templates and (ii) a front-end user interface and system (pages 7-8, 12-13, 15-16, 18-19, 21-22, 24-25, 27-28, 33-34, 40-41, 43-44, and 50-56) that is used to allow for the creation of variable print products using templates created via the back-end administrative system. These specific descriptions from this Appendix A are also hereby incorporated by reference to supplement the disclosures provided herein.

DESCRIPTION OF EMBODIMENTS

Figure 8A:
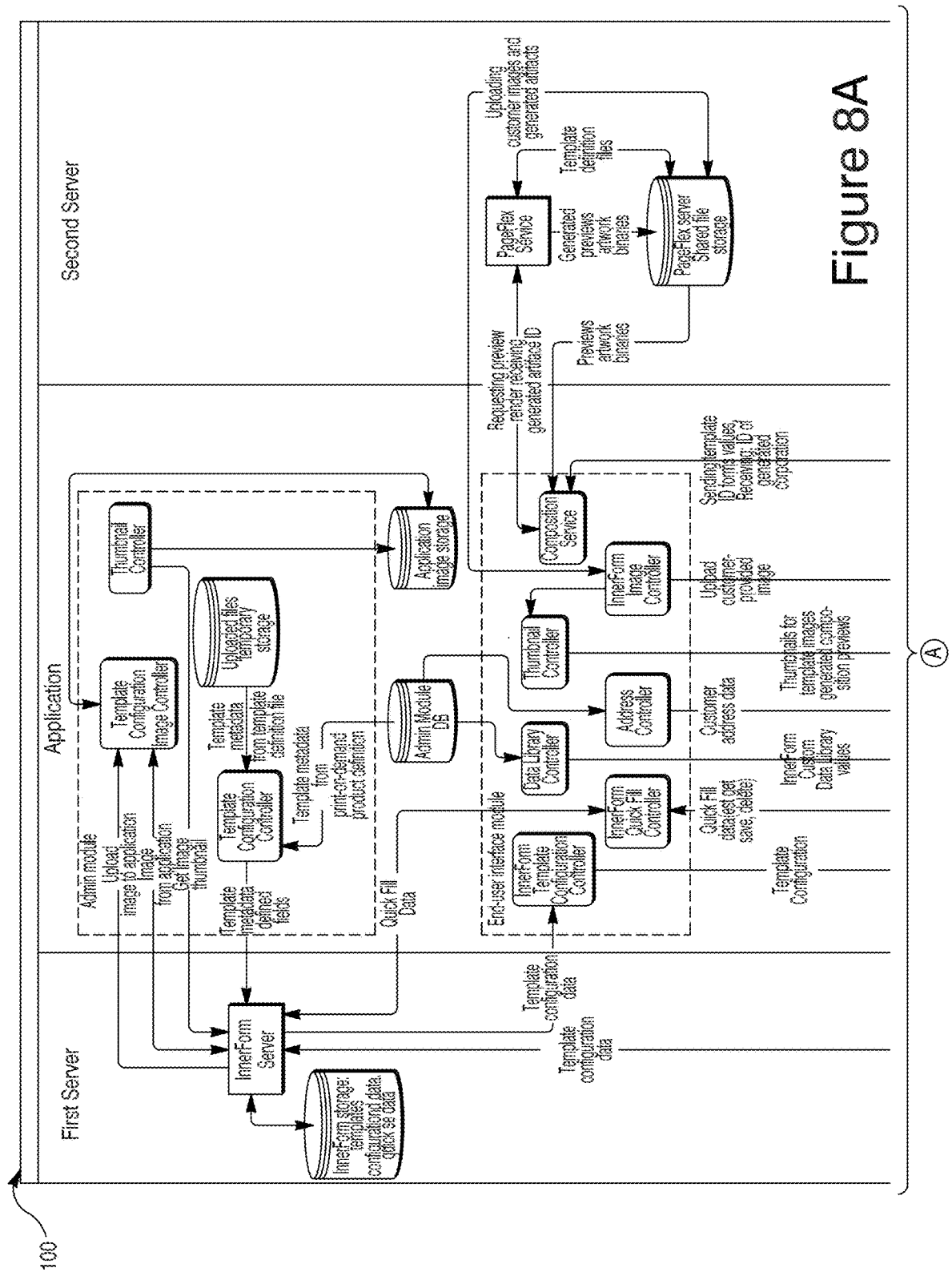
FIGS. 8A-8B show a system block diagram that is used to illustrate data flow operations that are used to construct and store templates and to allow users to use those templates to create variable print products, in accordance with some embodiments.
Figure 8B:
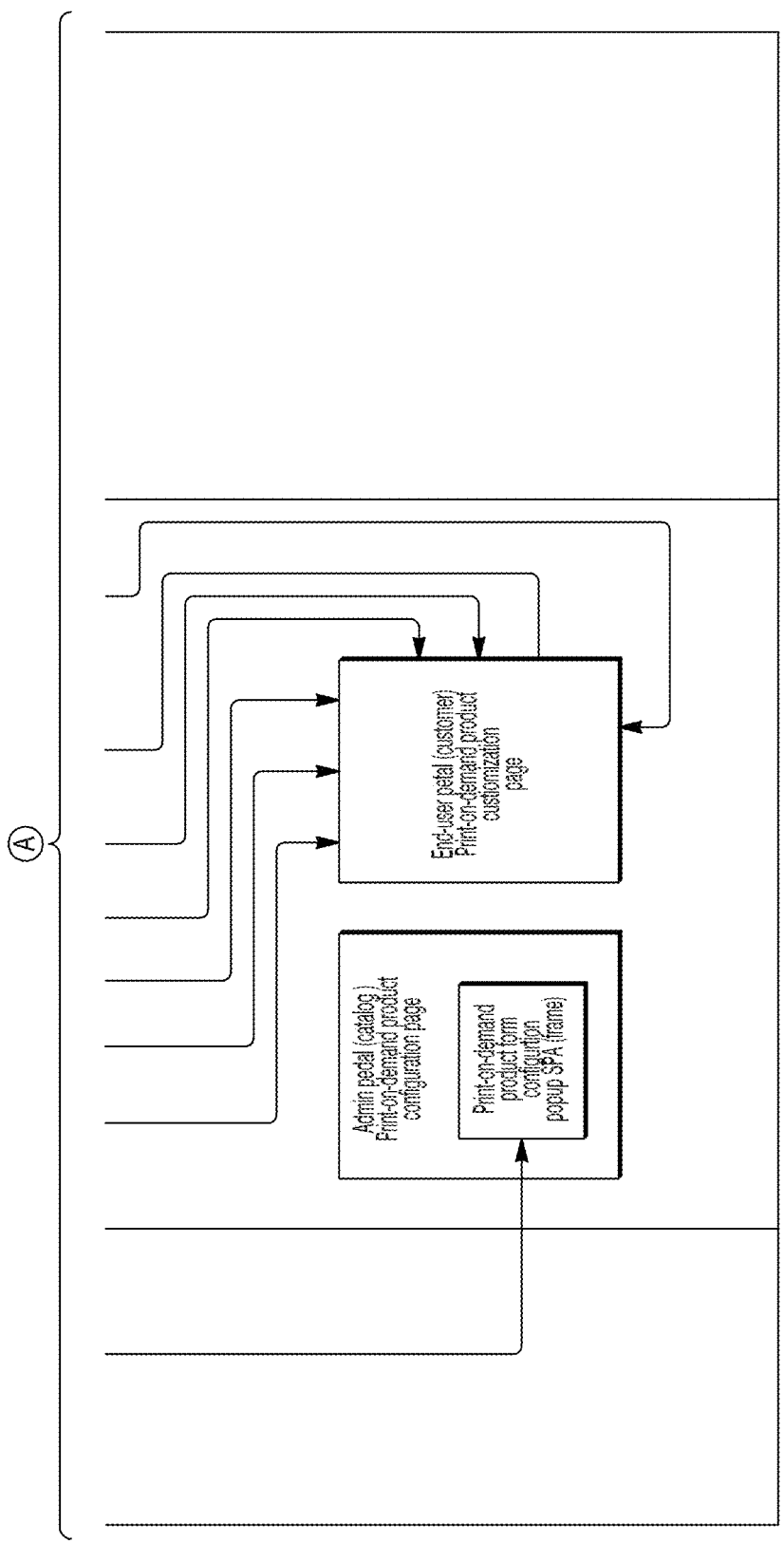

FIG. 1 illustrates a print procurement system 100 in which some embodiments operate (additional details and, in particular, data flow operations are shown in FIGS. 8A-8B). One or more users each interact with one or more user computing devices 102 (also referred to as computing device 102 and device 102), such as a desktop computer, a laptop computer, a tablet computer, a tablet, a mobile computing device, a mobile phone, or a virtual machine running on such a device. An example computing device 102-1 is described below with respect to FIG. 2, including various software programs or modules that execute on the computing device 102-1. In some embodiments, the computing device 102-1 includes a web browser 220 (FIG. 2) that is capable of executing a print procurement web application 222 (FIG. 2), a print procurement application 224 (FIG. 2), a variable print product creation module 226, and a variable print product data fetching module 228 that the computing device 102-1 (or an application installed thereon such as print procurement application 224) uses to allow users to easily create variable print products by re-using sophisticated templates (e.g., the users are able to easily input data and provide values for elements that are then used to product and render the variable print products).

In some embodiments of the print procurement system 100, the user computing devices 102 communicate with the one or more print procurement servers 106 over one or more networks 104. The one or more networks (e.g., network(s) 104) communicably connect each component of the print procurement system 100 with other components of the print procurement system 100. In some embodiments, the one or more networks 104 include public communication networks, private communication networks, or a combination of both public and private communication networks. For example, the one or more networks 104 can be any network (or combination of networks) such as the Internet, other wide area networks (WAN), local area networks (LAN), virtual private networks (VPN), metropolitan area networks (MAN), peer-to-peer networks, and/or ad-hoc connections.

Figure 2:
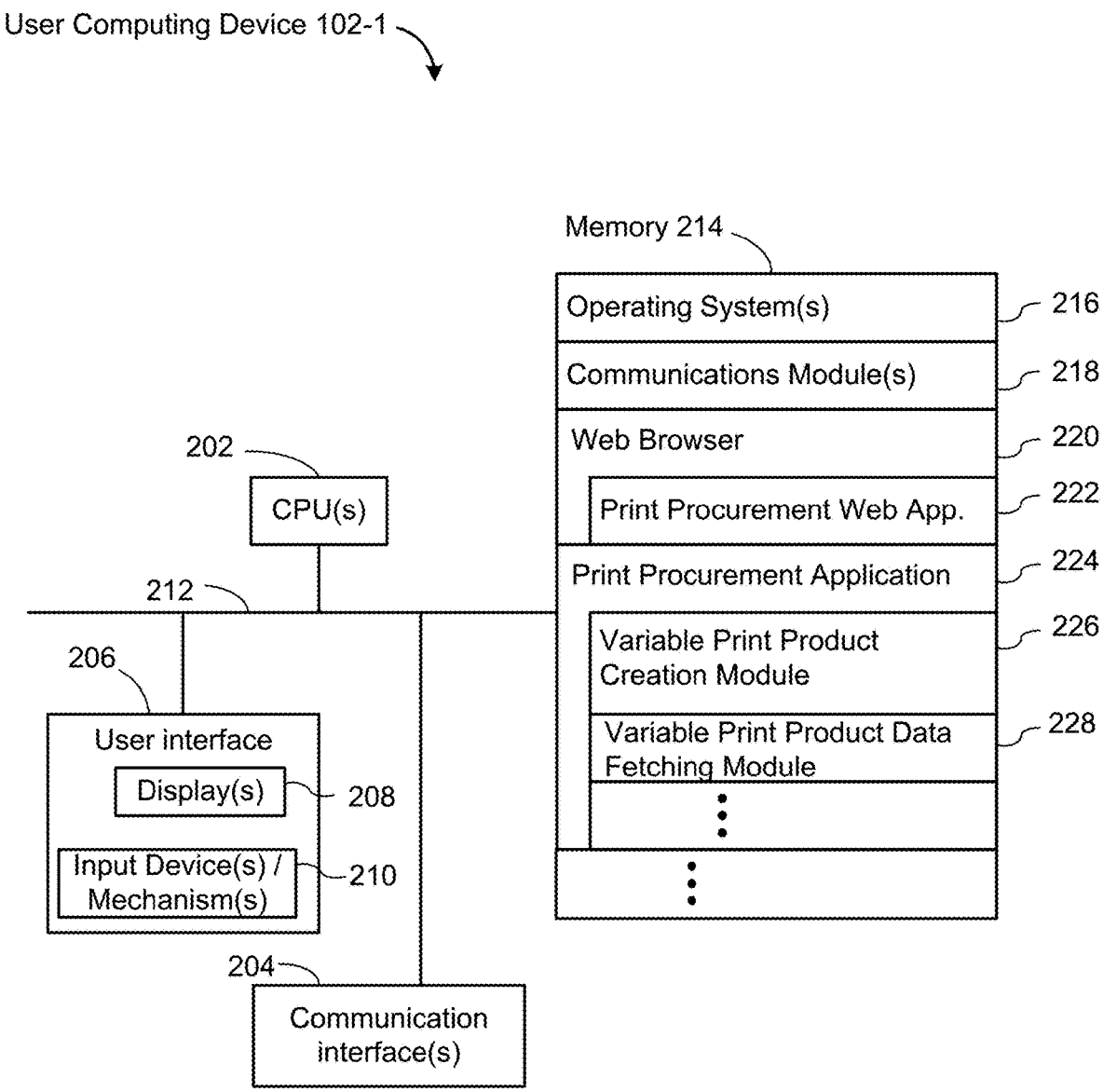
FIG. 2 is a block diagram of a computing device, in accordance with some embodiments.
Figure 3:
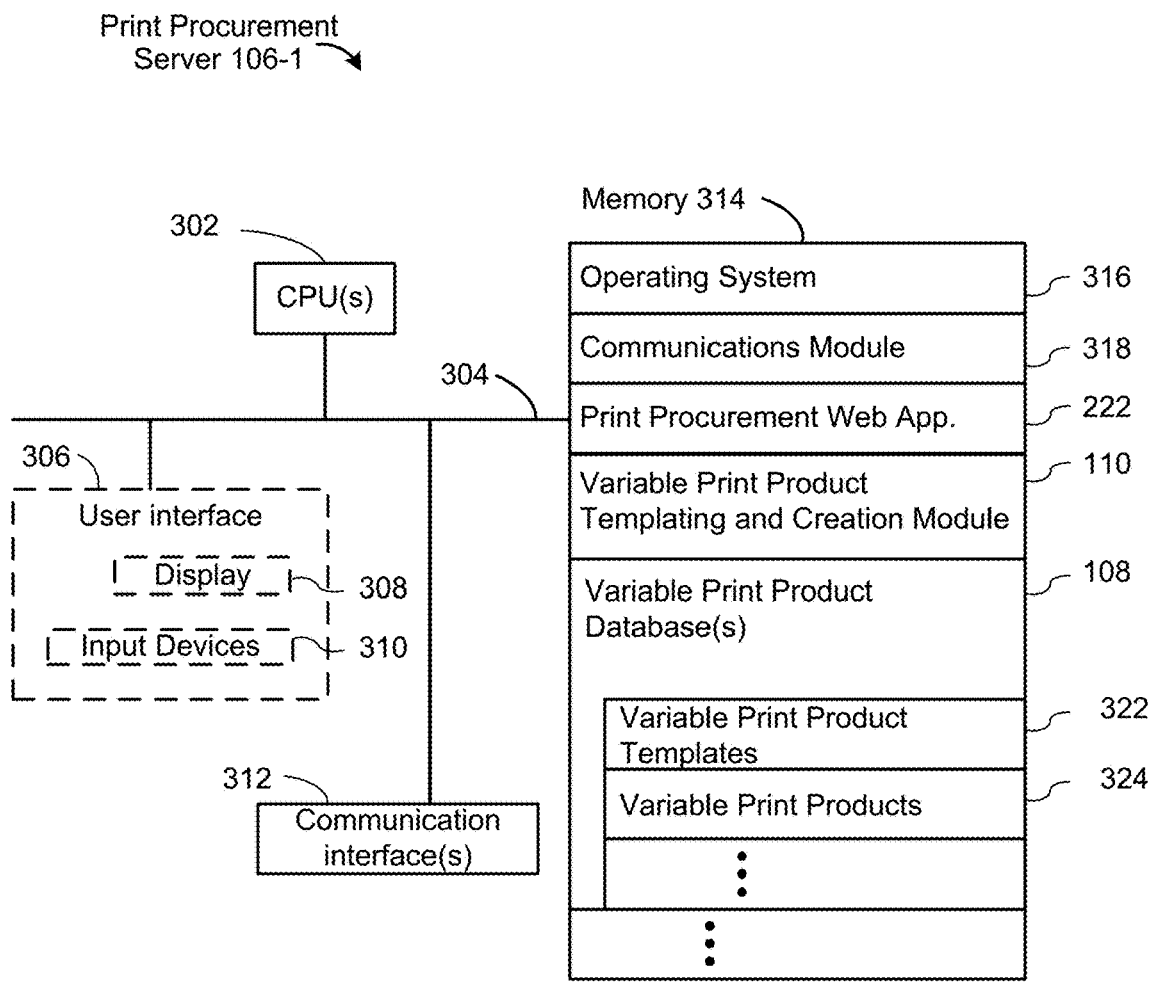
FIG. 3 is a block diagram of a print procurement server, in accordance with some embodiments.

An exemplary print procurement server 106-1 (also referred to herein as a server 106-1) is described in more detail with respect to FIG. 3. As mentioned above, some embodiments provide a print procurement web application 222 (FIG. 2) that runs wholly or partially within a web browser 220 (FIG. 2) on the computing devices 102. In some embodiments, print procurement functionality (e.g., creation of variable print products using information associated with stored templates) is provided by both a local print procurement application 224 and certain functions are provided by communicating with the one or more servers 106 over the one or more networks 104. For example, the one or more servers 106 may be used for resource-intensive operations.

In some embodiments, the computing devices 102 connect to one or more remotely located print procurement servers 106 through communication network(s) 104. In this way, some print procurement operations can be performed remotely and computing resources at the computing devices 102 can be preserved for other operations. For example, operations requiring input from a user are performed at the computing devices 102 (e.g., the user interacts with one or more user interfaces provided on the computing devices 102 (such as the user interfaces shown in FIGS. 6A-6B, 7A-7H, and 8) and information identifying user input and user interactions at the user interfaces are sent to the remotely located print procurement servers 106 for storage and/or further processing).

The one or more print procurement servers 106, in some embodiments, include a variable print product templating and creation module 110 that allows users (such as an owner of a franchise that is accessing a franchise-wide template for creating restaurant menus) to access information about stored templates in order to create their own variable print products. For example, an administrative user (such as a representative of a corporation that owns a franchising operation) creates a template that allows individual franchise owners to create menus using the template (in this way, the corporation is able to ensure that certain look-and-feel and pricing constraints are consistent across all franchise locations and franchisees have any easy way to quickly create custom menus).

In some embodiments, an allocation of operations between the computing devices 102 and the servers 106 is determined in accordance with bandwidth limitations at the computing devices 102. For example, by monitoring a history of bandwidth usage against available bandwidth at a respective computing device 102, a baseline measurement for bandwidth requirements at the respective computing device 102 can be established (e.g., if after observing/monitoring bandwidth usage for a predefined period of time (e.g., 2 days), bandwidth usage averages 100 MB per hour, then 100 MB hour can be established as the baseline). By establishing the baseline measurements for bandwidth usage, a determination can then be made to determine whether to perform a data-intensive operation at the computing device 102 or at one of the servers 106. For example, in accordance with a determination that a first operation requires more than a predefined percentage (e.g., 10%, 20%, or 30%) of the baseline bandwidth, then the first operation should be performed at one of the servers 106 and not at the computing device 102. In some embodiments, the baseline bandwidth is a baseline measured against bandwidth usage over 20 minutes, 45 minutes, 1.5 hours, 6 hours, or the like.

In some embodiments, information about stored templates (e.g., design elements, input elements, and other like elements that are defined and stored with the templates to allow for creating variable print products) and information about variable print products that have been created using the stored templates is/are all stored in the one or more variable print product templates databases 108 for easy access and storage.

In some embodiments, the print procurement system 100 is provided by a print procurement service provider. The print procurement service provider connects entities requiring print jobs to create/purchase printed materials (e.g., banners, posters, business cards, etc.) with suppliers capable of fulfilling the print jobs. In some embodiments, print jobs each include one or more items (i.e., items of printed material). In some embodiments, the entities requiring the print jobs rely on the print procurement service provider to locate suppliers on their behalf. Typically, the print procurement service provider assigns a print procurement manager ("PPM") to the entity and the PPM is responsible for interacting with the print procurement system 100 (e.g., through the print procurement web application or print procurement application) to locate appropriate suppliers. In some embodiments, the entities requiring print jobs are referred to herein as clients of the print procurement system or as clients of the print procurement service provider. In some embodiments, a PPM or some other representative of the client interacts with the print procurement application or the print procurement web application. In some embodiments, each entity represents a single shipping location (e.g., a branch of a large organization) and, thus, a number of PPMs are associated with the large organization as a whole, even though each entity is only associated with one or two PPMs responsible for helping to manage print procurement orders for that entity.

FIG. 2 is a block diagram illustrating one of the computing devices 102 (e.g., computing device 102-1) that a user uses to interact with a locally installed print procurement application (e.g., print procurement application 224) and/or to interact with a print procurement web application (e.g., print procurement web application 222) using a web browser (e.g., web browser 220), in accordance with some embodiments. A computing device 102-1 typically includes one or more processing units/cores (CPUs/GPUs) 202 for executing modules, programs, and/or instructions stored in the memory 214 and thereby performing processing operations; one or more network or other communications interfaces 204; the memory 214; and one or more communication buses 212 for interconnecting these components. The communication buses 212 may include circuitry that interconnects and controls communications between system components.

The computing device 102-1 also includes a user interface 206 that includes a display device 208 and one or more input devices or mechanisms 210. In some embodiments, the input device/mechanism 210 includes a keyboard; in some embodiments, the input device/mechanism includes a "soft" keyboard, which is displayed as needed (e.g., in response to a user tapping a user input element that requires input from a keyboard, the soft keyboard is displayed) on the display device 208, enabling a user to "press keys" that appear on the display 208. In some embodiments, the display 208 and input device/mechanism 210 comprise a touch-screen display (also called a touch-sensitive display). In other embodiments, the display 208 and input device/mechanism 210 comprise a separate monitor and a separate keyboard that are in communication with the computing device 102-1.

In some embodiments, the computing device 102-1 has memory 214 that includes high-speed random access memory, such as DRAM, SRAM, DDR RAM, or other random access solid state memory devices. In some embodiments, the memory 214 includes non-volatile memory, such as one or more magnetic disk storage devices, optical disk storage devices, flash memory devices, or other non-volatile solid-state storage devices. Optionally, the memory 214 includes one or more storage devices remotely located from the CPU(s)/GPUs 202. The memory 214, or alternately the non-volatile memory device(s) within the memory 214, comprises a non-transitory computer-readable storage medium. In some embodiments, the memory 214, or the non-transitory computer-readable storage medium of the memory 214, stores the following programs, modules, and data structures, or a subset thereof:
- an operating system 216, which includes procedures for handling various basic system services and for performing hardware-dependent tasks;
- a communications module 218, which is used for connecting the computing device 102-1 to computers and devices via the one or more communication interfaces 204 (wired or wireless) and one or more communication networks 104 (FIG. 1), such as the Internet, other wide area networks, local area networks, metropolitan area networks, and so on;
- a web browser 220 (or other client-side application capable of displaying web pages), which enables a user to communicate over a network with remote computers, servers, and/or devices. In some embodiments, the web browser 220 executes a print procurement web application 222 provided by one or more print procurement servers 106 (e.g., by receiving information from the server 104 as needed to fulfill requests to view information). In some embodiments, a print procurement web application 222 is provided as an alternative to (or in addition to) storing a print procurement application 224 locally on the computing device 102-1;
- a print procurement application 224, which enables users to interact with a print procurement system 100 (FIG. 1) such as by navigating through web pages, inputting data into web pages, and the like. In some embodiments, the print procurement application 224 retrieves information from one or more variable print products databases 108 (FIG. 1) that are stored on one or more print procurement server(s), then generates and displays the retrieved information in user interfaces that allow the users to, for example, provide values for form elements that are used to then render a new version of a variable print product (e.g., the users are able to provide names and prices for various menu options, while creating a new version of a menu based off of a stored template for creating that menu, as explained in more detail below in reference to FIG. 6). In some instances, the print procurement application 224 invokes other modules (either on the computing device 102-1 or at one or more print procurement servers 106), as described in more detail below. The print procurement application 224 also includes one or more of the following additional modules, or a subset or superset thereof:
  - a variable print product creation module 226 for providing user interfaces (such as those shown in FIGS. 7A-7H) that allow users to provide values for various form elements to then create a new version of a variable print product using the provided values; and/or
  - a variable print product data fetching module 228 for retrieving information from databases that are locally stored on the device 102-1 or that are remotely located from the device 102-1 (e.g., from one or more variable print product databases 108 on one or more print procurements servers 106, such as data that instructs the variable print product creation module 226 regarding available form elements and available options for providing inputs to the available form elements).

Each of the above-identified executable modules, applications, or sets of procedures may be stored in one or more of the previously mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise rearranged in various embodiments. In some embodiments, the memory 214 may store a subset of the modules and data structures identified above. Furthermore, the memory 214 may store additional modules or data structures not described above. In some embodiments, the programs, modules, and data structures stored in the memory 214, or the non-transitory computer-readable storage medium of the memory 214, provide instructions for implementing some of the methods described below.

Although FIG. 2 shows a computing device 102-1 in accordance with some embodiments, FIG. 2 is intended more as a functional description of the various features that may be present rather than as a structural schematic of the embodiments described herein. In practice, and as recognized by those of ordinary skill in the art, items shown separately could be combined and some items could be separated.

FIG. 3 is a block diagram illustrating a print procurement server 106-1 (e.g., one or more print procurement servers 106, FIG. 1), in accordance with some embodiments. The print procurement server 106-1 may host one or more variable print product databases 108 and may provide various executable applications or modules. A server 106-1 typically includes one or more processing units (CPUs/GPUs) 302, one or more network interfaces 304, a memory 314, and one or more communication interface(s) 312 for interconnecting these components. In some embodiments, the server 106-1 optionally includes a user interface 306, which includes a display device 308 and one or more input devices 310, such as a keyboard and a mouse. In some embodiments, the server 106-1 is in communication with the user interface 306 (e.g., the display device 308 is a separate monitor that is coupled with the server 106-1).

The memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPU(s)/GPUs 302. The memory 314, or alternately the non-volatile memory device(s) within the memory 314, includes a non-transitory computer-readable storage medium. In some embodiments, the memory 314 or the non-transitory computer-readable storage medium of the memory 314 stores the following programs, modules, and data structures, or a subset thereof:

- an operating system 316, which includes procedures for handling various basic system services and for performing hardware dependent tasks;
- a network communications module 318, which is used for connecting the server 106-1 to other computers via the one or more communication interfaces 304 (wired or wireless) and one or more communication networks 104 (FIG. 1), such as the Internet, other wide area networks, local area networks, metropolitan area networks, and so on;
- a print procurement web application 222 (or information about the print procurement application), which may be downloaded and executed by a web browser 220 (FIG. 2) on a user's computing device 102. In some embodiments, the print procurement web application 222 allows the server 106-1 to serve information related to the print procurement system 100 to one or more user computing devices 102 (FIG. 1);
- a variable print product templating and creation module 110 for managing templates that are used to create variable print products (e.g., managing information about stored templates created using an administrative interface and managing information about variable print products created using the stored templates);
- one or more variable print product databases 108 for storing information about templates and variable print products created using the templates. In some embodiments, the one or more print job databases 108 include one or more of the following additional modules, or a subset or superset thereof:
  - information about variable print product templates 322, such as element names, element types, options (e.g., that may be used to provide values for each element), input-acceptance rules (e.g., rules that are used to validate that an input provided for a particular element is acceptable or valid), access level requirements (e.g., defining which user types are able to view and/or edit different elements), and quick fill information (e.g., information that is used to auto-complete or quickly fill-in values for elements), and the like, and as discussed in more detail below in reference to FIGS. 4A-4B; and
  - information about variable print products 324 that may have been created using one or more of the stored variable print product templates (e.g., the information may include values provided by users for each element that is associated with a particular stored template).

Each of the above-identified executable modules, applications, or sets of procedures may be stored in one or more of the previously mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise rearranged in various embodiments. In some embodiments, the memory 314 may store a subset of the modules and data structures identified above. Furthermore, the memory 314 may store additional modules or data structures not described above. In some embodiments, the programs, modules, and data structures stored in the memory 314, or the non-transitory computer-readable storage medium of the memory 314, provide instructions for implementing some of the methods described below.

Although FIG. 3 shows a server 106-1 in accordance with some embodiments, FIG. 3 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to a server 106-1 may be stored on a computing device 102-1. In some embodiments, the functionality and/or data may be allocated between one or more computing devices 102 and one or more servers 106 (as explained in more detail above in reference to FIG. 1). Furthermore, one of skill in the art recognizes that FIG. 3 need not represent a single physical device. In many embodiments, the server functionality is allocated across multiple physical devices that comprise a server system. As used herein, references to a "server" or "print procurement server" include various groups, collections, or arrays of servers that provide the described functionality, and the physical servers need not be physically collocated (e.g., the individual physical devices could be spread throughout the United States or throughout the world).

Figures 4A, 4B:
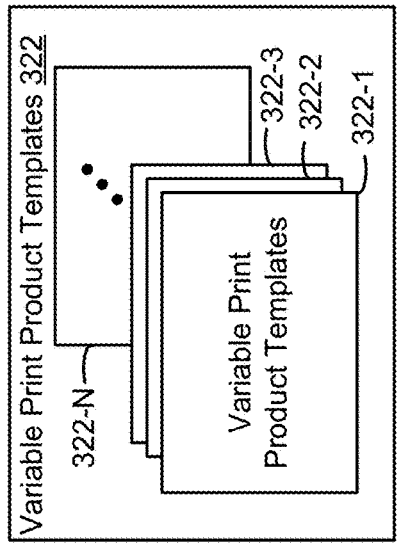
FIGS. 4A-4B are block diagrams illustrating data structures for storing templates that are used to create variable print products, in accordance with some embodiments.

FIGS. 4A-4B are block diagrams illustrating data structures for storing information about variable print product templates, in accordance with some embodiments. As shown in FIG. 4A, variable print product templates 322 (e.g., those that are included in the databases 108, FIG. 3) include a collection of data structures 322, optionally implemented as a collection of tables for each particular client of a print procurement system 100, that each store information about variable print product templates associated with the particular client of the print procurement system 100 (e.g., variable print product templates data structure 322-1 stores information about variable print product templates for client 1 of the print procurement system 100 and variable print product templates data structure 322-2 stores information about variable print product templates for client 2 of the print procurement system 100). In some embodiments, each table (e.g., table 322-1, 322-2, 322-3 . . . 322-N) in the collection of variable print product templates data structures stores information about variable print product templates for more than one client (e.g., variable print product templates data structure 322-1 stores information about variable print product templates for client 1 and for client 3, because clients 1 and 3 are related corporate entities that often share templates, making storage in a single table an efficient and memory-saving option).

In some embodiments, determining whether to store information about variable print product templates for more than one client or for a single client in a respective table 322 is determined when a new client begins using the print procurement system. For example, the print procurement system scans through the variable print product templates data structures 322 in order to determine whether any related corporate entities, associated with the new client, are already enrolled and using the print procurement system. In accordance with a determination that a related corporate entity, associated with the new client, is using the print procurement system, then a respective variable print product templates data structure 322 associated with the related corporate entity is initialized/formatted to store information about variable print product templates associated with the new client in addition to the related corporate entity. In some embodiments, the new client, while enrolling to use the print procurement system, provides information about related corporate entities and this information is used to efficiently scan through the variable print product templates data structures 322 (e.g., the scan only looks for information about related corporate entities matching those provided by the new client).

In some embodiments, the clients are customers of the print procurement service provider (discussed above in reference to FIG. 1). In some embodiments, the clients are each assigned to one or more print procurement managers ("PPMs") responsible for interacting with the print procurement system and helping the clients to create and manage their variable print product templates.

Figure 5A:
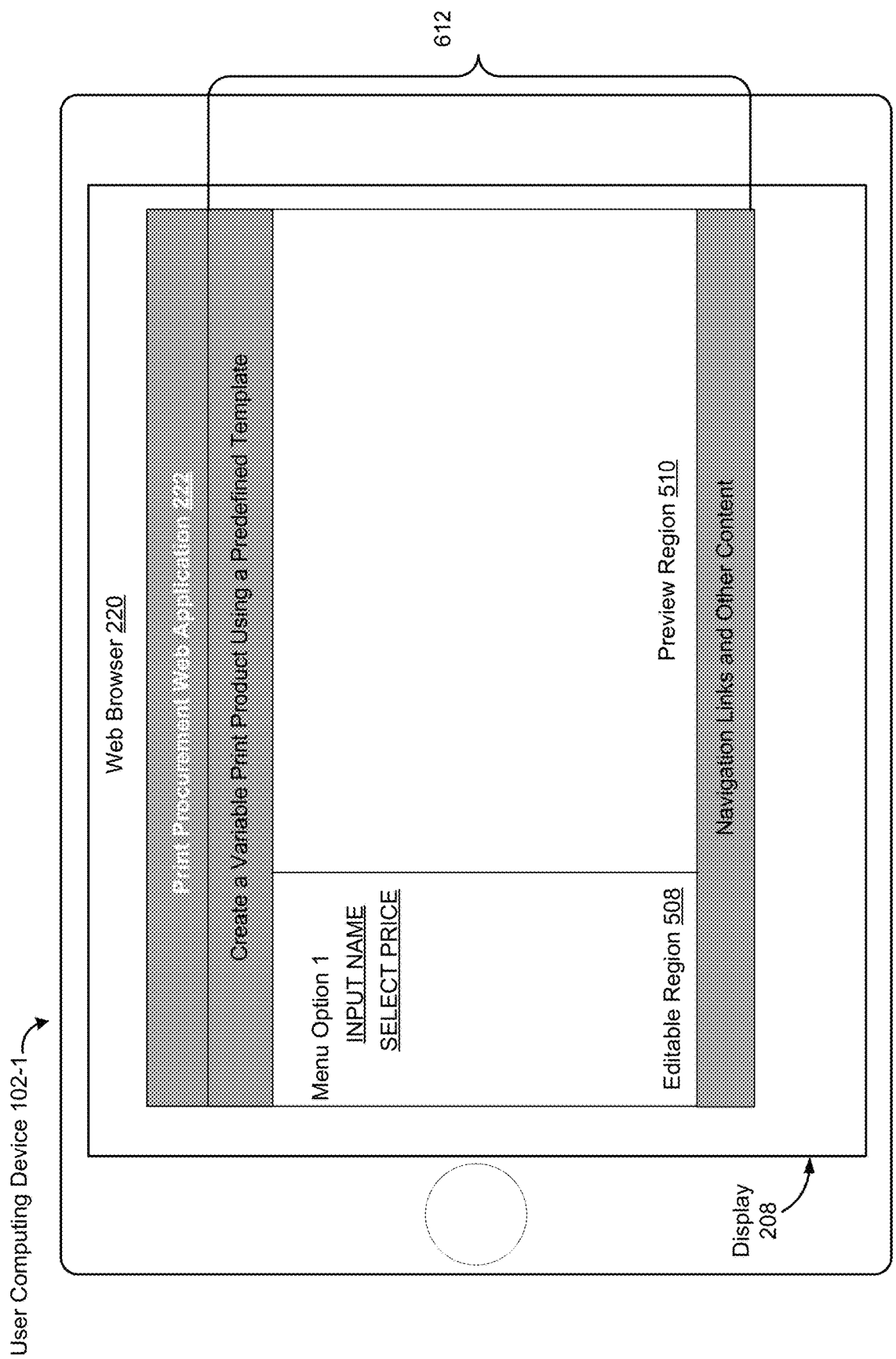
FIG. 5A is a schematic of a display showing an example user interface for creating variable print products using a template, in accordance with some embodiments.
Figure 5B:
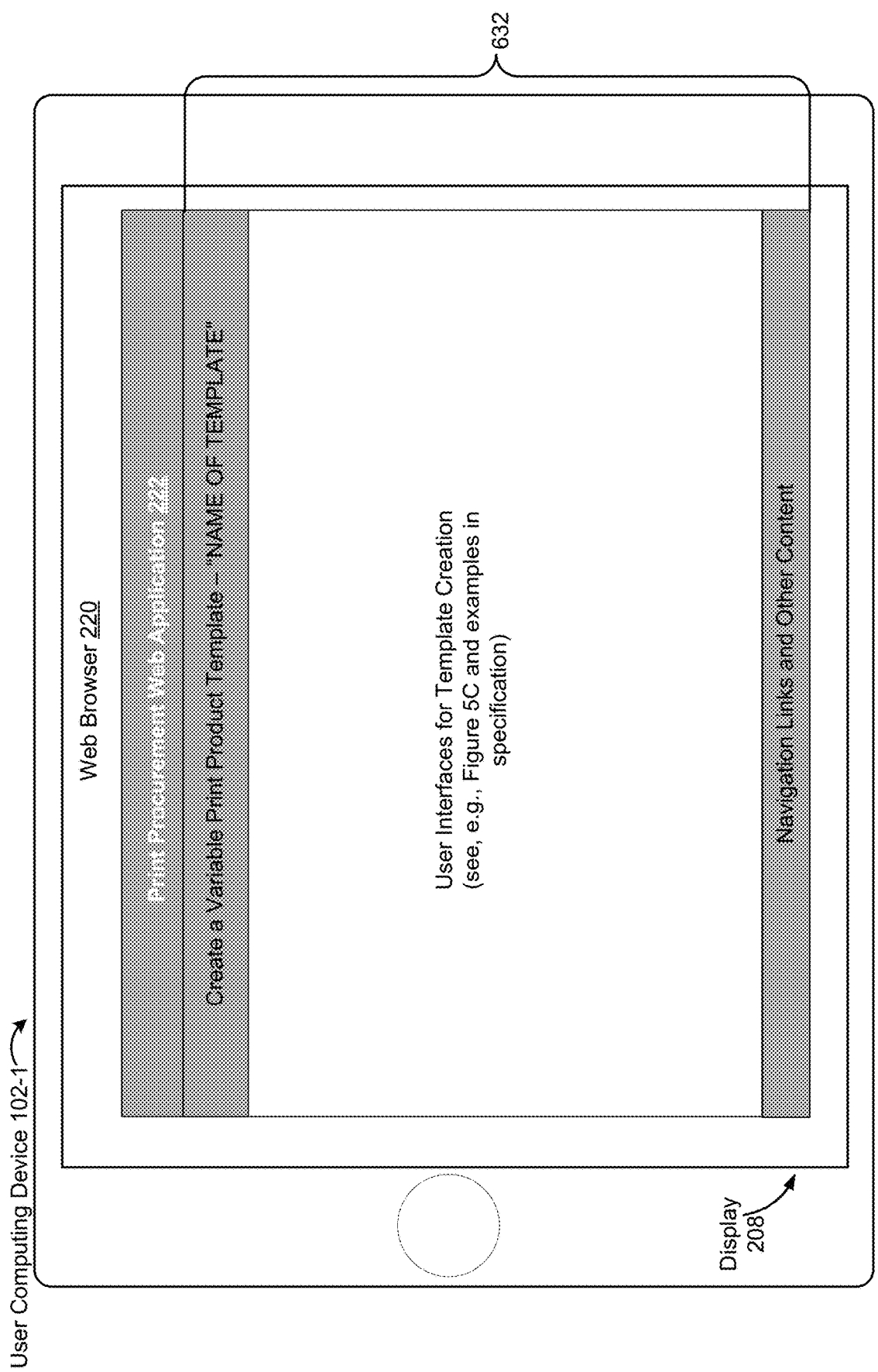
FIGS. 5B-5C are schematics of a display used to illustrate example user interfaces for creating a template form that is used to help render and produce customized variable print products (i.e., user interfaces for an administrator application that is used to generate templates), in accordance with some embodiments.
Figure 5C:
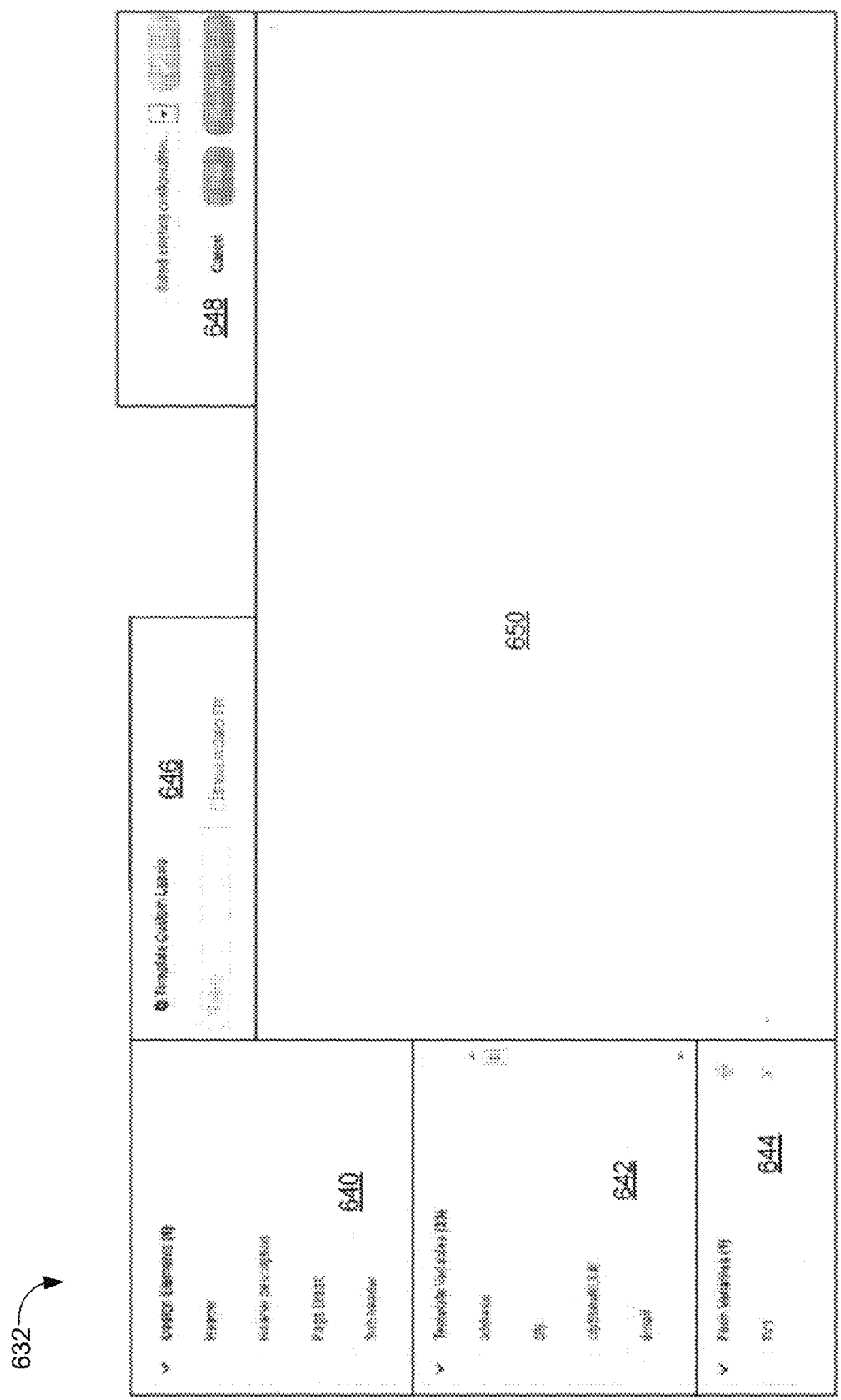

In some embodiments, one or more variable print product templates data structures 322 (e.g., variable print product templates data structure 322-1, FIG. 4B) are used for storing information about variable print product templates associated with a particular client of the print procurement system 100. As illustrated in FIG. 4B, variable print product templates data structure 322-1 contains data (e.g., template ID, element name, element type, options, input-acceptance rule, access level required, and quick fill) associated with variable print product templates for client 1. In some embodiments, the data is stored in individual records 410-1, 410-2, 410-3, through 410-N. In some embodiments, a header field 410-0 is used to describe each field of information associated with each of the respective records. Header 410-0, in some embodiments, contains a brief description of each field of information (e.g., each field associated with each of the records) stored within the table. As shown in FIG. 4B, header 410-0 indicates that each record 410-1, 410-2, 410-3, through 410-N stores the following information and data structures, or a subset or superset thereof:

a value for a "template ID" field that uniquely identifies each variable print product template in a respective data structure 322;

a value for an "element name" field that includes a description of a respective element that is associated with a particular variable print product template that was provided by a user (e.g., an administrative user) during creation of the particular variable print product template (e.g., while adding elements to the particular variable print product template via an administrative user interface, such as that shown in FIGS. 5B-5C);

a value for an "element type" field that represents a type for a respective element (e.g., a radio element, a drop-down, an image, and the like, and additional examples are discussed below);

a value for an "options" field that corresponds options that are available for a respective element (e.g., available drop-down options, an image library that is available for selection, pricing options, etc.);

a value for an "input-acceptance rule" field that corresponds to whether a respective element is associated with a rule that restricts acceptable inputs for the respective element (e.g., a value for a pricing element must be within a particular range of values). In some embodiments, the "input-acceptance rule" field may also accept a NULL value to indicate that no input-acceptance rule is associated with the respective element;

a value for an "access level required" field that corresponds to an identifier for indicating a level of access that is required to view, access, and/or edit a respective element (e.g., only an administrative user is able to edit the respective element); and/or a value for a "quick fill" field that includes information that is used to auto-populate a respective element based on user selection of a quick fill button (e.g., such as that discussed in reference to FIG. 6) or, in some embodiments or circumstances, based on a user having left a blank value for a particular element.

In some embodiments, variable print product templates data structure 322-1 includes fields in addition to the fields described above, such as a timestamp field that identifies when a respective variable print product templates was created and/or stored in the data structure 322-1 and/or a related field that includes one or more template ID values that correspond to templates that are associated with a similar grouping of other templates (e.g., templates for related menus, such as a dinner and a lunch menu).

As shown in FIG. 4B, the variable print product templates data structure 322-1 includes records 410-1, 410-2, 410-3 through 410-N. As one example of the information stored in an example record in the variable print product templates data structure 322-1, record 410-1 stores a value of "1" in the template ID field, a value of "Appetizer1 Price" in the element name, a value of "Dropdown" in the element type field, a value of "{1.99, 2.99, 3.99}" in the options field, a value of "Value<5" in the input-acceptance rule field, a value of "No" in the access level required field, and a value of "2.99" in the quick fill field.

Although illustrated as a particular implementation of a data structure (e.g., a table), the data structures of FIGS. 4A-4B, in some embodiments, are implemented in XML files, tables within a relational database, a document-oriented database, text files, and/or any other suitable format for storing data. In some embodiments, the exact entries in each of these fields that are stored in a back-end data structure may differ from the entries shown in FIGS. 4A-4B (e.g., the dates for the time period field may be stored differently).

Turning now to FIG. 5A, a schematic of a display is shown and used to illustrate a user interface for creating variable print products using a template (e.g., displaying elements associated with the template and allowing a user to provide values for each of elements to create the variable print product), in accordance with some embodiments. For ease of reference, the user interfaces discussed below are described as displayed within a web browser but, in other embodiments, the user interfaces may be displayed within a locally-installed application, such as a mobile phone/device or desktop application (e.g., print procurement application 224). The user interfaces described in reference to FIG. 5A is one example and additional user interfaces for print procurement applications are also shown in FIGS. 7A-7H (as discussed in more detail below) and may be used to perform some of the functions described with respect to the user interface in FIG. 5A.

As shown in FIG. 5A, a web browser (e.g., web browser 220, FIG. 2) of a user computing device (e.g., user computing device 102-1) is used to render information received from a server (e.g., one or more print procurement servers 106, FIG. 1) in order to display portions of a print procurement web application (e.g., print procurement web application 222, FIG. 2). In some embodiments, the print procurement web application 222 displays information about form elements that is retrieved from one or more servers 106 (FIGS. 1 and 3) and the displayed information includes user interface region 612. In some embodiments and as shown in FIG. 5A, the user interface region 612 includes an editable region 508 and a preview region 510. In some embodiments, each of the retrieved form elements is displayed in the editable region 508 and, as a user provides values for various elements, the preview shown in the preview region 510 is updated accordingly (as explained in more detail below in reference to FIG. 7A-7H).

Figure 7B:
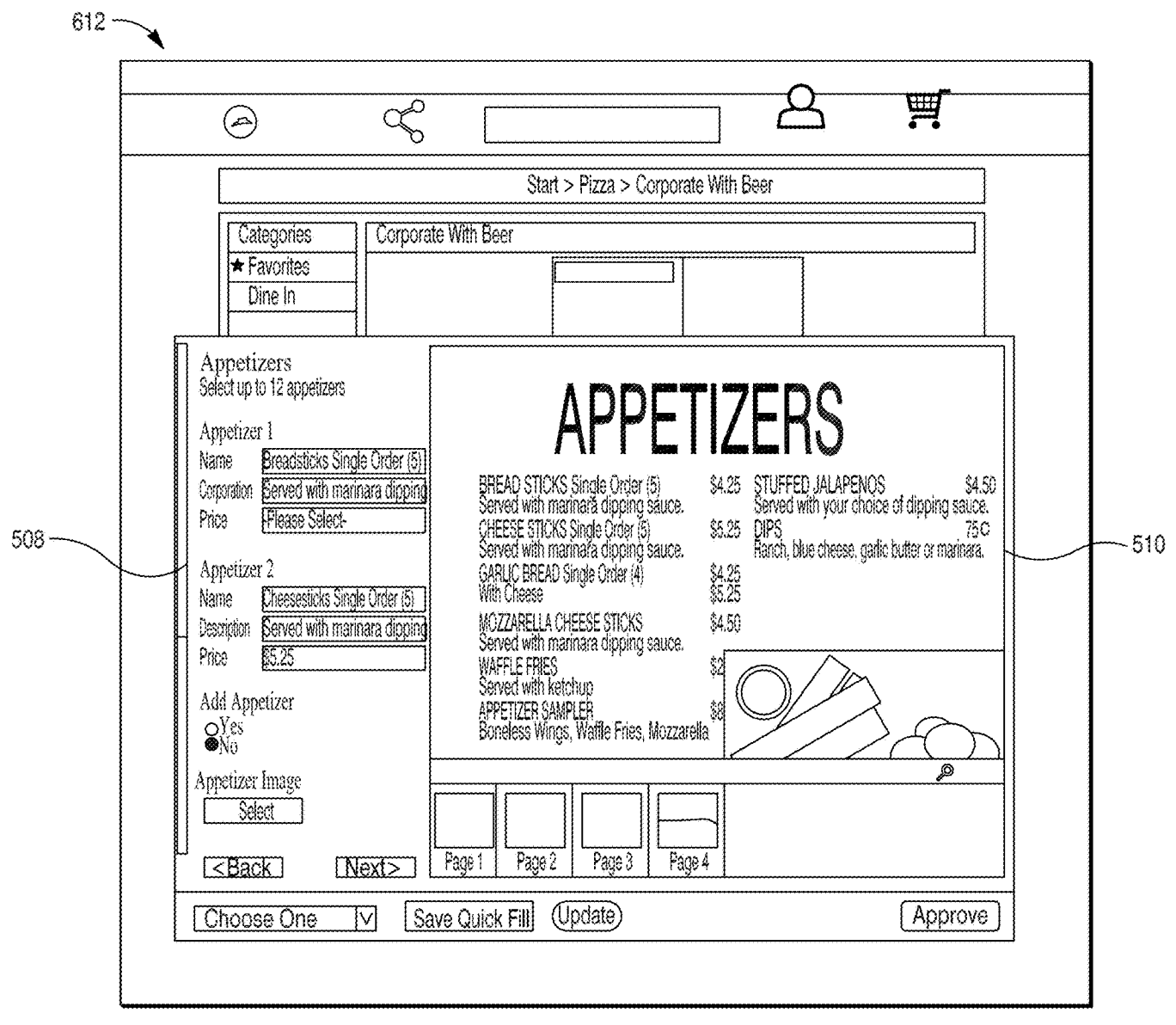
Figure 7C:
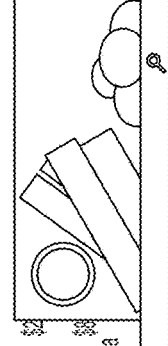
Figure 7D:
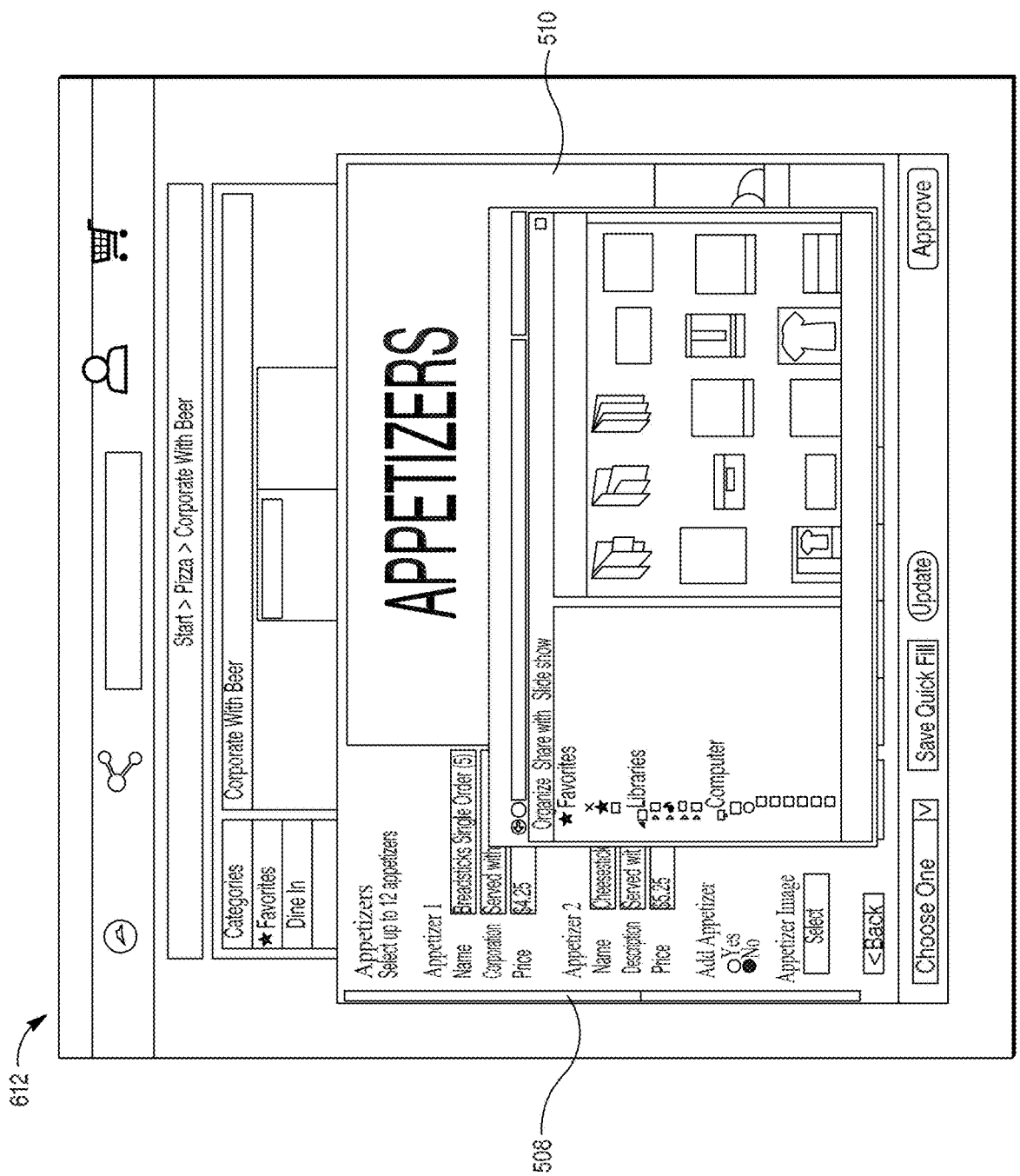
Figure 7E:
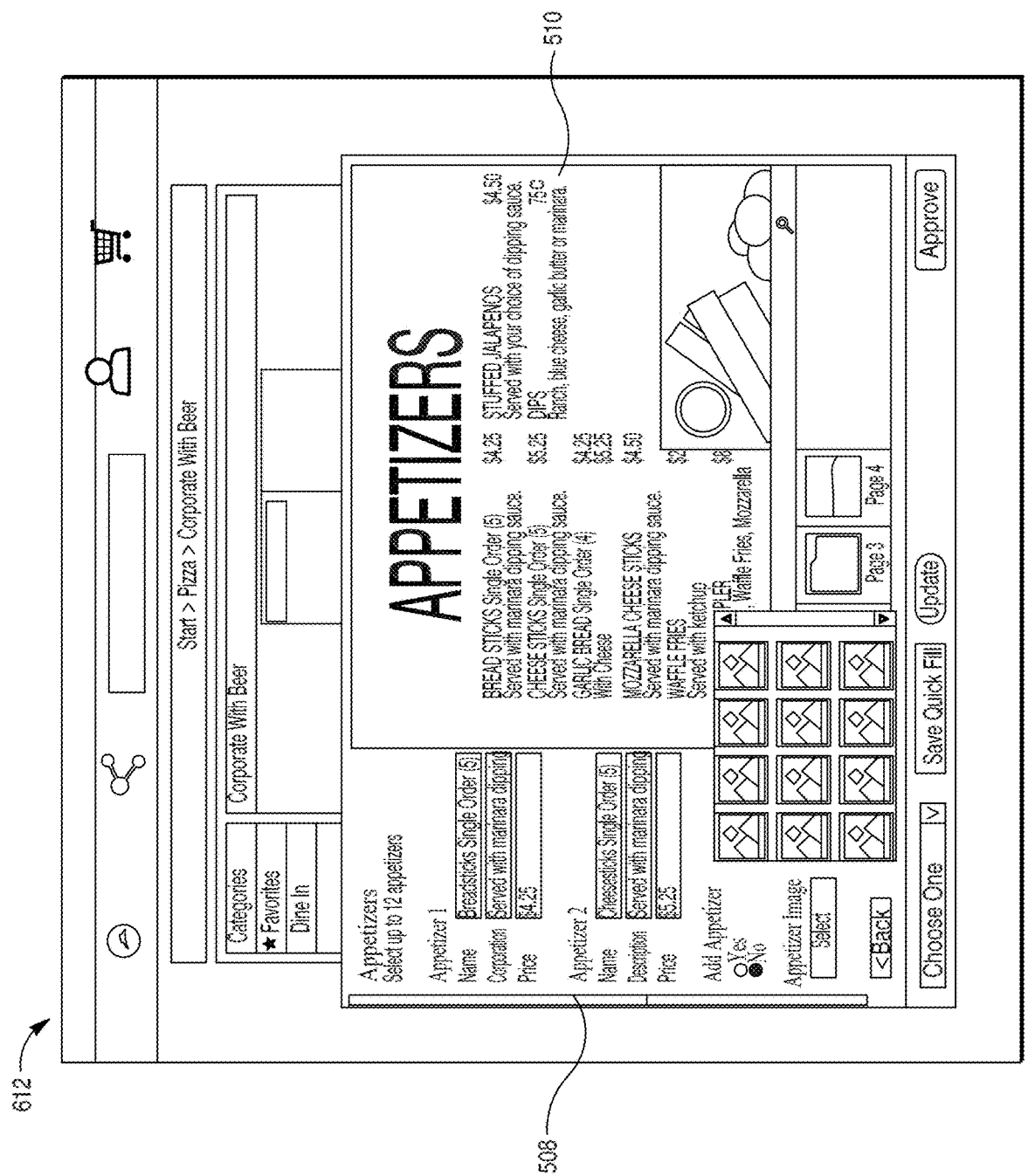

In some embodiments, the user interface 612 also includes page divisions or indicators that are used to divide the form elements across one or more pages (e.g., a first set of form elements is associated with a first page of the variable print product and only one set of form elements is shown at a time). For example, as shown in FIG. 7A, form elements are divided up between four separate pages.

In some embodiments, the user interface 612 also includes quick fill options that, when selected, cause the form elements to be auto-populated based on predefined values for each of the form elements (e.g., values that are chosen by an administrator, so that users are able to quickly create a completed variable print product without having to separately define values for individual form elements).

Additional details regarding the user interface shown in FIG. 5A are provided below in reference to FIGS. 7A-7H. In some embodiments, the visual characteristics and interactive features of the user interfaces shown in FIG. 5A include one or more visual characteristics and/or interactive features of the user interfaces shown in FIGS. 7A-7H.

Turning now to FIGS. 5B-5C schematics of a display used to illustrate example user interfaces are shown. The examples user interfaces of FIGS. 5B-5C are for creating a template form that is used to help render and produce customized variable print products (i.e., user interfaces for an administrator application that is used to generate templates), in accordance with some embodiments. In some embodiments, the administrative application is accessed by an administrator and allows the administrator to create/configure templates and individual template elements. In some embodiments, the administrator application includes a user interface 632. The user interface 632 may include the user interface objects and regions 640-650 shown in FIG. 5C.

As shown in FIG. 5C, the user interface 632 may include a design elements region 640, a template variables region 642, a form variables region 644, a template custom labels region 646, an existing configuration selection region 648, and a form elements preview and configuration region 650. As explained in detail below, in some embodiments, these regions allow users to add headers and page breaks to organize form elements, arrange template variables on the form, configure data entry types for template variables, add form variables to control how template variables display or default, customize the labels on the data entry screen, and save and reuse a template form and various configuration values for the form.

In some embodiments, to group and organize the fields that will display to the user when creating variable print products using the template (e.g., a user of a front-end application that is used to create variable print products, as described below in reference to FIGS. 7A-7H), design elements in the region 640 are clicked and dragged into the preview and configuration region 650. An example of the region 640 is provided in FIG. 7I.

Figure 7F:
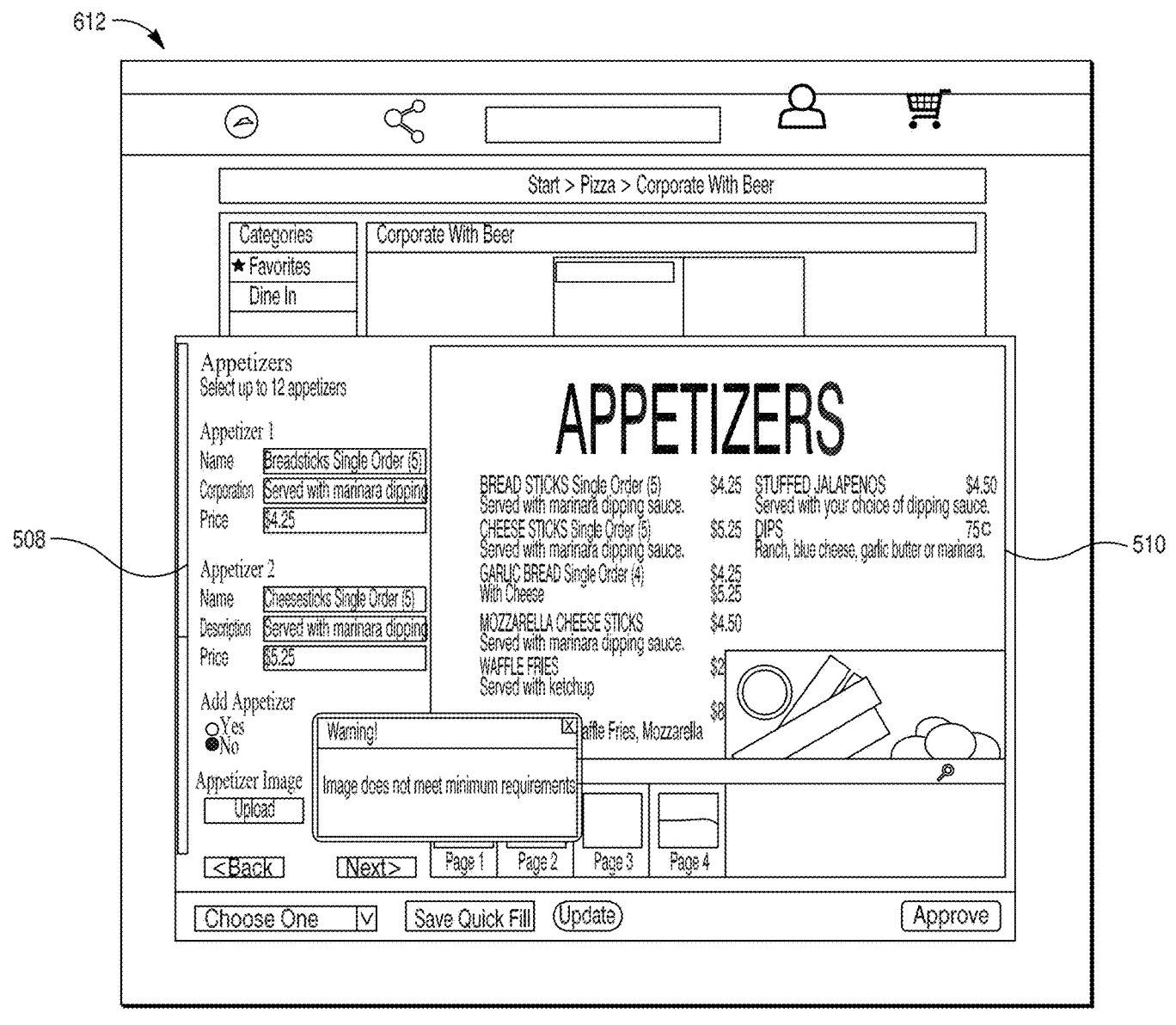
Figure 7G:
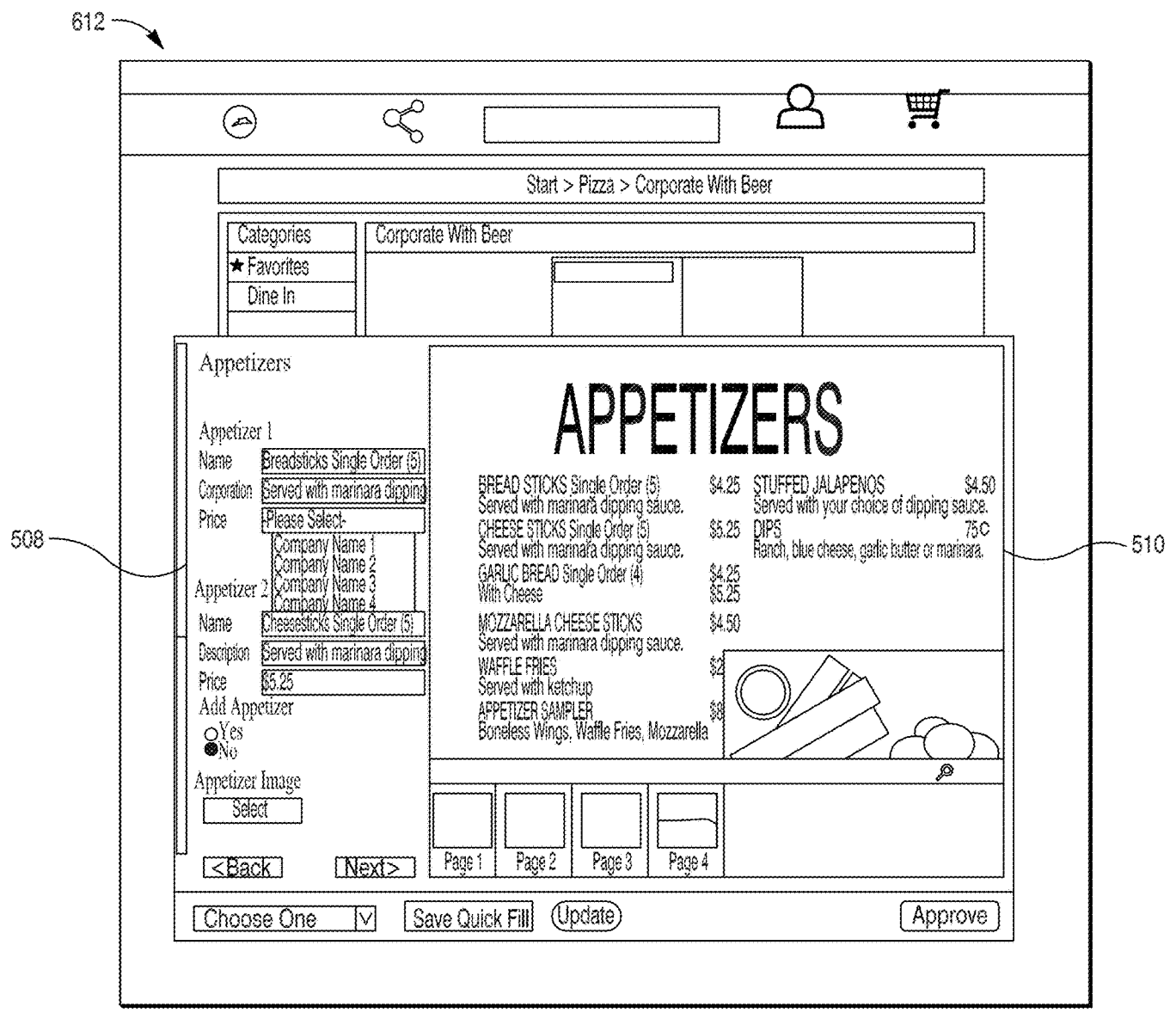
Figure 7H:
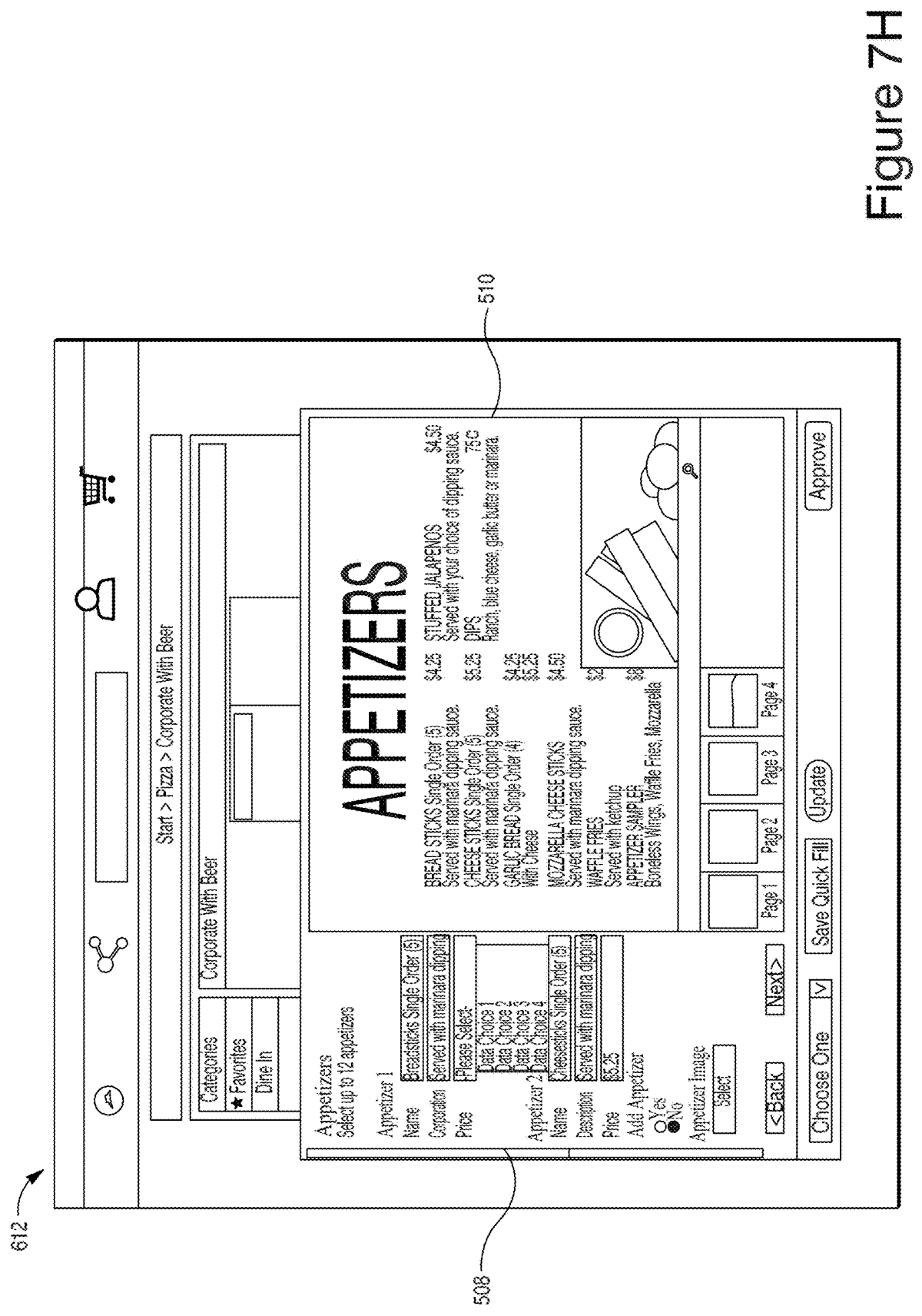
Figure 7I:
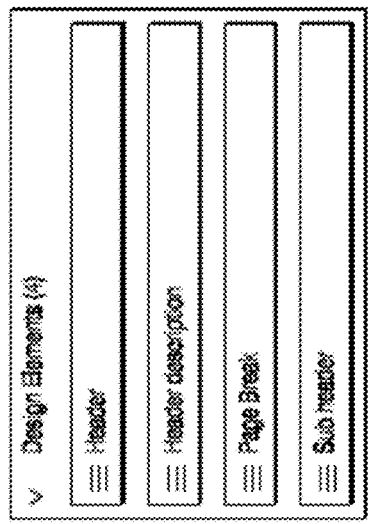
Figure 7J:
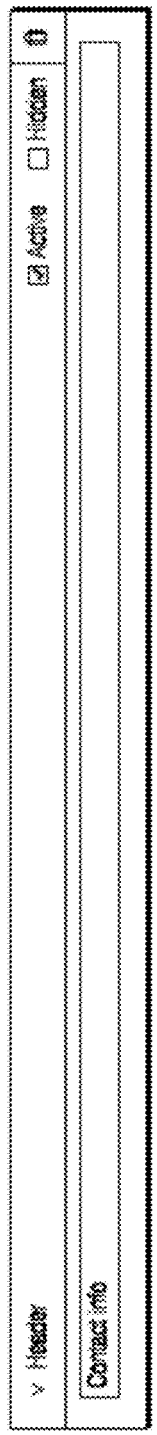

As one example of the use of the user interface elements shown in FIG. 7I, in response to receiving a drag and drop selection of the "Header" design element, then the region 650 is populated with a user interface object that allows for configuring a header form element, such as the user interface object shown in FIG. 7J. In some embodiments, the header form element may be easily deleted by clicking on the trash icon shown in the user interface object of FIG. 7J.

In some embodiments, administrators are also able to arrange template variables that will then be used on the front-end to allow individual end-users to customize values for their variable print products. In some embodiments, template variables refer to variable data elements that print on a particular variable print product based on what a user enters (using a front-end application, such as that shown in FIGS. 7A-7H). In order for a variable to be available for a user to enter data so that it will print on the variable print product, an administrator may configure a field that corresponds to that variable on the data entry form. In some embodiments, a list of drag-able template variables is displayed in a region 642. In some embodiments, the list of drag-able template variables includes those template variables that have not already been added to the form.

Figure 7K:
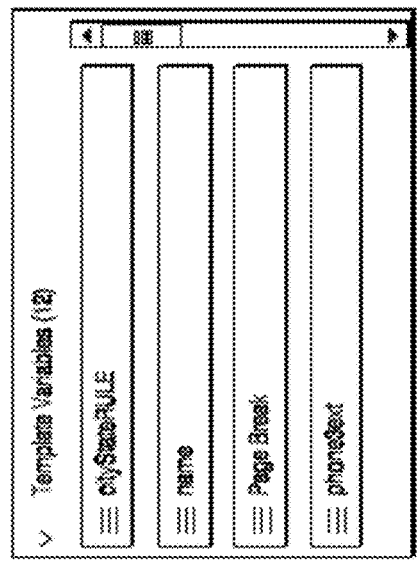

An administrator may click and drag a template variable onto the body of the form (e.g., region 650) to add it using user interface elements such as those shown in FIG. 7K.

Figures 7L, 7M, 7N, 7O:
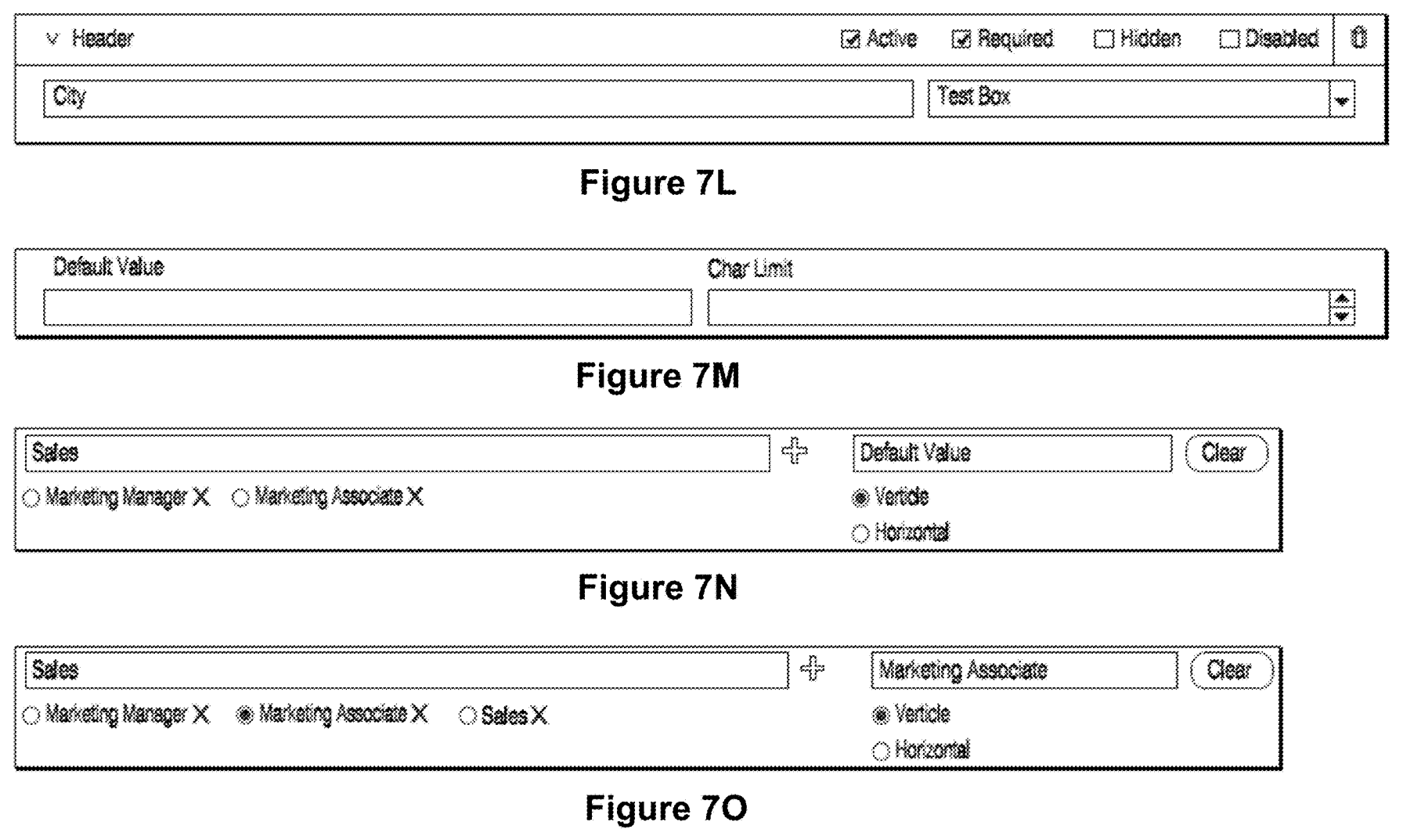

In some embodiments, after dragging and dropping a particular template variable onto the region 650, the administrator is then able to select various configuration options for the particular template variable (e.g., selecting a Required checkbox if the user must fill out this field, selecting a Disabled if the field should not be editable, and enter a label for the field in the blank text box provided). As an example, if an administrator drags and drops a "cityStateRULE" form element (such as that shown in FIG. 7K) from the region 642 and onto the region 650, then a new user interface object, such as that shown in FIG. 7L, is presented in the region 650.

In some embodiments, additional configuration options for the form element may also be available and these additional configuration options depend on what data entry type is selected from the user interface shown in FIG. 7L (as explained in more detail below). In some embodiments, the data entry type is elected by clicking over a data entry type drop-down shown above that shows the text "Text Box" and then selecting an option for choosing a new data entry type.

In some embodiments, the following data entry types may be available for template variable fields: (i) Text Box/Text Area; (ii) Radio Buttons; (iii) Drop Down; (iv) Date Picker;

(v) Image Upload (vi) Image Library (user selects one of the available image files); (vii) Data Library (user selects from a list of options that may vary from user to user).

In some embodiments, text boxes and text areas are similar, but text areas may also allow multiple lines of text to be entered. When configuring these types of fields, an administrator may optionally enter a default value and specify a character limit, such as by user the user interface shown in FIG. 7M.

In some embodiments, after selecting a radio button option (e.g., from the data entry type drop-down such as that shown in FIG. 7L), the administrator then types text for each available option. In some embodiments, selecting a displayed "+" sign next to the text entry box allows for adding new radio button options (an example of this "+" sign is shown in FIGS. 7N and 7O, in which a user adds a radio button option of "Sales" between FIGS. 7N and 7O). In some embodiments, this is repeated until all desired options have been added. In some embodiments, administrators may also determine whether the radio buttons should be arranged vertically or horizontally, such as by selecting the options shown in FIGS. 7N-7O.

In some embodiments, if one of the radio button options should be selected by default, then the administrator selects it in the list that is displayed below the text entry box, e.g., as is shown by the selection of the option for "Marketing Associate" in FIG. 7O).

Figures 7P, 7Q, 7R, 7S, 7T:
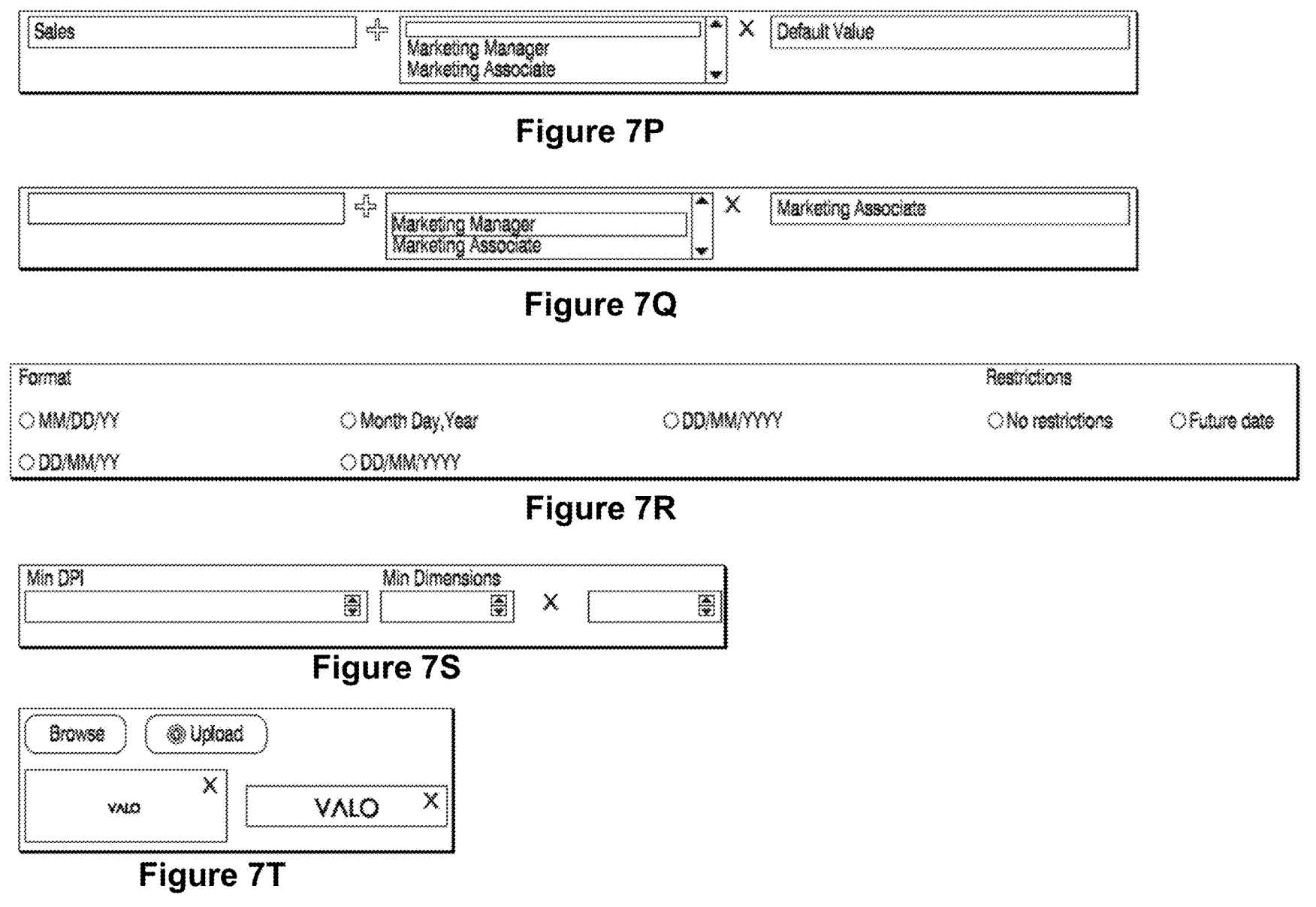

In some embodiments, after selecting the drop-down option from the data entry type drop-down, the administrator may configure available drop-down options by typing text in a text entry field and then clicking the green plus sign to add additional drop-down options, as is shown in FIGS. 7P-7Q.

In some embodiments, if one of the drop-down options should be selected by default, the administrator may highlight it in the list, as is shown in FIG. 7Q (where "Marketing Manager" is selected as a default). If no value should default for a particular field, then a user would simply leave the blank space at the top of the list in FIG. 7Q highlighted (an example of this is shown in FIG. 7P).

In some embodiments, a date picker may also be configured by selecting the date picker option from the data entry type drop-down, and an example of a date picker user interface is shown in FIG. 7R.

In some embodiments, an image selector may also be used by selecting that option from the data entry type drop-down (an administrator may be able to set applicable restrictions on image resolution and dimensions), and an example of an image selector user interface is shown in FIGS. 7S and 7T.

In some embodiments, an image may be selected from a library of images. For example, the administrator clicks a "Browse" button of FIG. 7T and locates each image that should be available for selection, then clicks "Upload" to add each image to the library of images. In some embodiments, to remove an image, the administrator clicks a red X in the upper right corner of the image thumbnail, such as those X options shown in upper right corners of FIG. 7T.

Figures 7U, 7V, 7W, 7X:
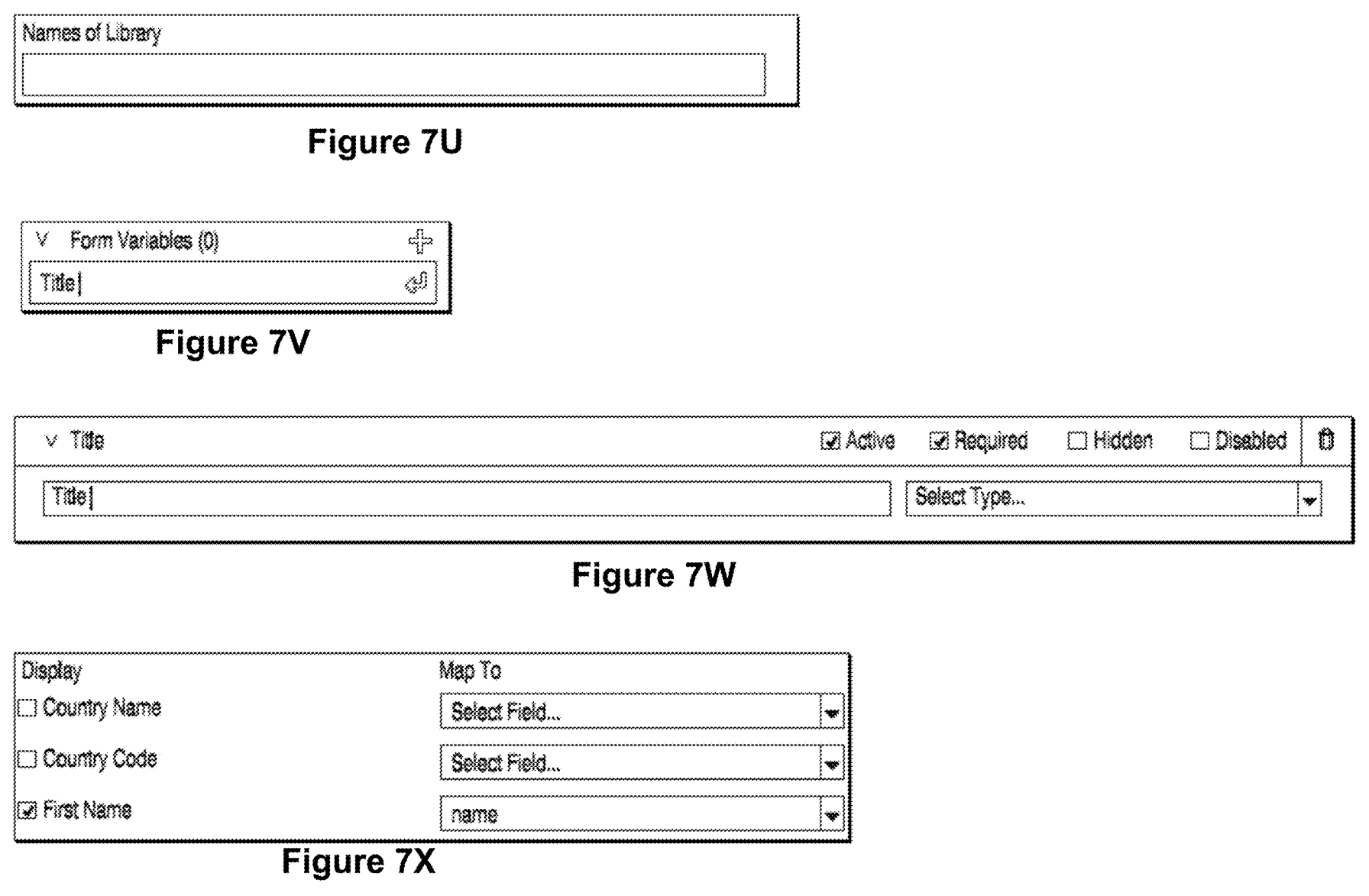

In some embodiments, the administrator may also allow end-users to select data from a data library (in some embodiments the data library is associated with a particular user's stored information at the print procurement server and, therefore, the administrator selects a name of the data library from a list of available names using a user interface such as the one shown in FIG. 7U).

In some embodiments, the form variables region 644 (FIG. 5C) allows administrators to customize certain aspects of the template form. In some embodiments, to add a new form variable, the administrator clicks a green plus sign above the Form Variables list (e.g., in FIG. 7V) and then types a name for the variable and presses enter:

In some embodiments, the administrator drags and drops a variable from region 642 on FIG. 5C to place it on the template form (e.g., drags and drops one of the variables from region 642, such as those shown in FIG. 7K, to the region 650). The administrator is then able to customize the template variable using a user interface such as that shown in FIG. 7W.

In some embodiments, the "Select Type" drop-down has many of the features discussed above for the data entry type drop-down. In some embodiments, an additional data entry type called Personal Address Book is also available for form variables. This additional data entry type provides an end-user with a drop-down list of addresses from their personal address books, and selecting an address will populate the corresponding template variables with the address information. After selecting Personal Address Book as the data entry type, a list of address fields displays. In some embodiments, the administrator then selects the checkbox next to each field that should pull into the template, and selects the appropriate template variable that it should populate using a user interface such as that shown in FIG. 7X.

Figure 7Y:
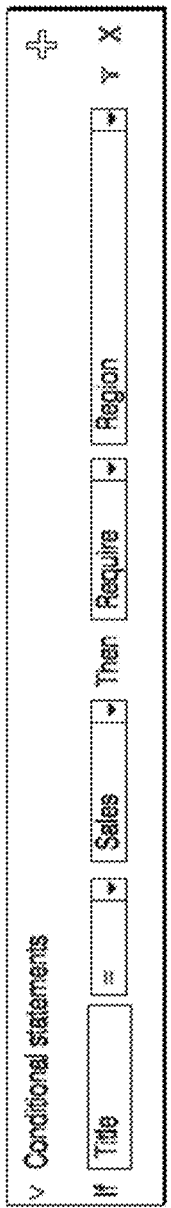

In some embodiments, template variables may also be used to configure conditional statements. This allows administrators to control when certain template fields display to the user, when they are required, and how they populate. In some embodiments, to enter a conditional statement, the administrator clicks the green plus sign next to conditional statements and fills out the available fields. As an example, the conditional statement shown in FIG. 7Y indicates that if the Title selected is Sales, the Region field should be required:

In some embodiments, Conditional statements are entered as if/then statements (if [condition], then [result]). In some embodiments, when specifying the condition, an administrator may select an operator of equals (=) or does not equal (!=), or, if the form variable is intended to accept numeric entries, operators of greater than (>), less than (<), greater than or equal to (2:), or less than or equal to (:S) may also be available. An administrator may also select an operator of null if this condition is based on the form variable being left blank. If the administrator selects null, no conditional value is required.

Figure 7Z:
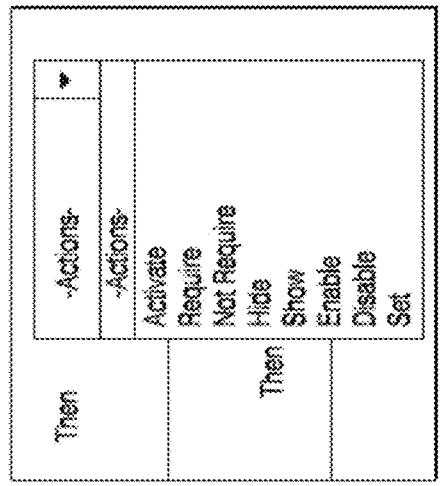
Figure 7A:
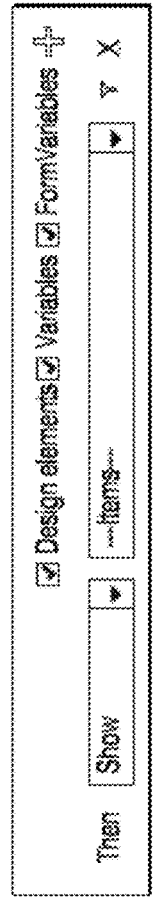
Figure 7A:
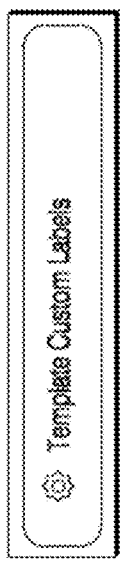
Figure 7A:
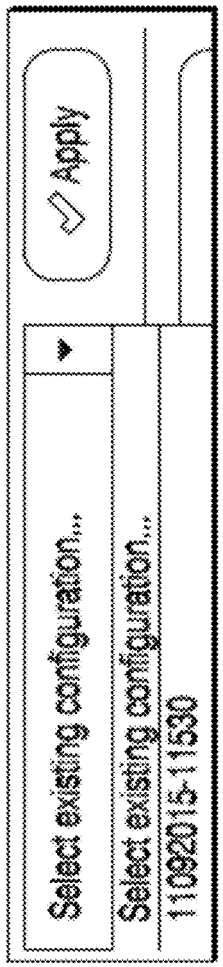
Figure 7A:
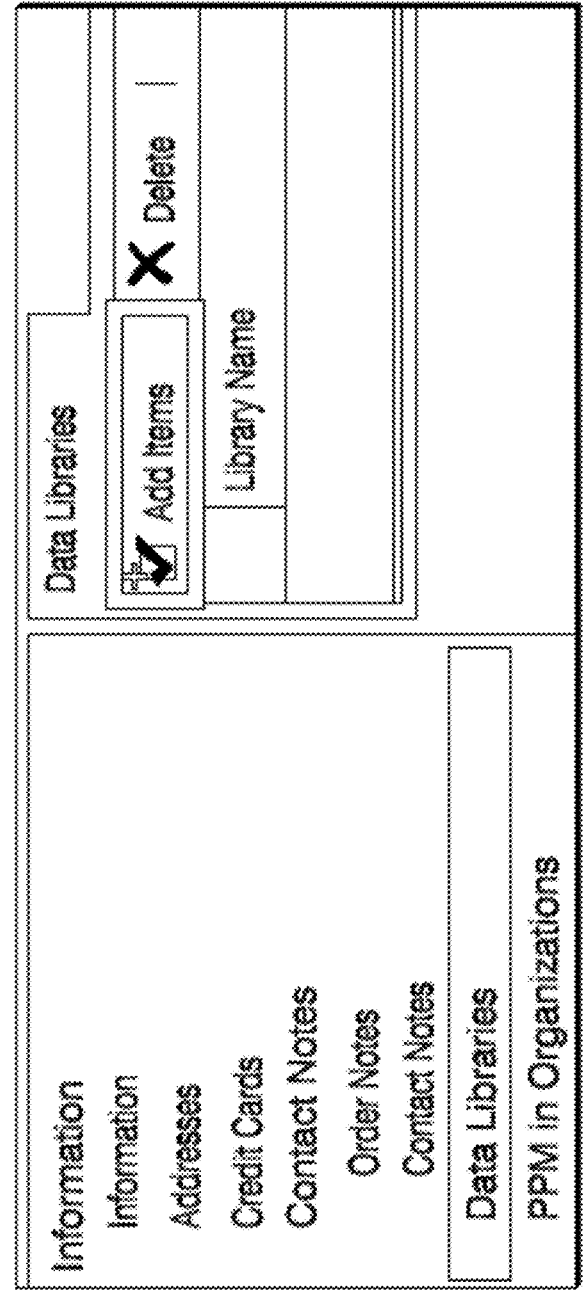
Figure 7A:
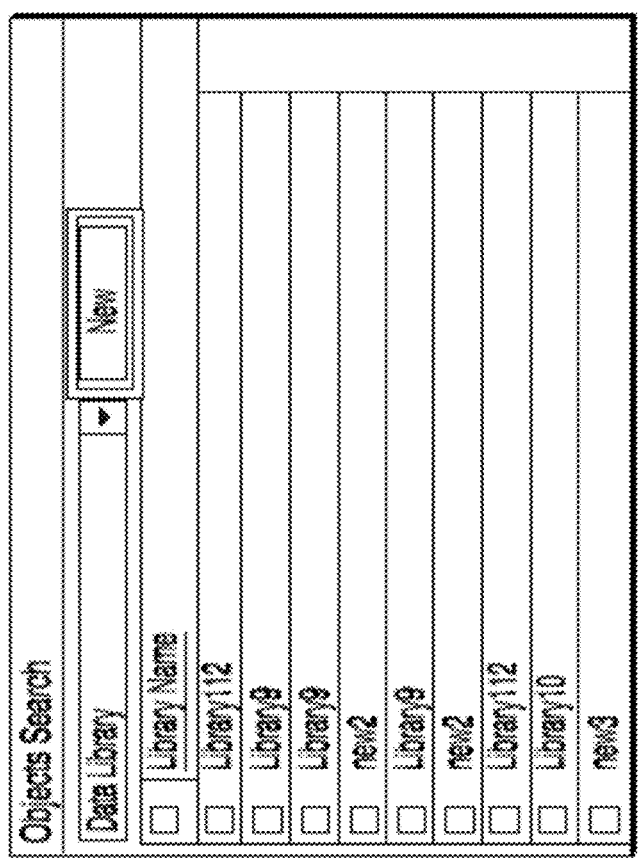

In some embodiments, after specifying a condition, the administrator may indicate a desired action, including selection from the following actions shown in FIG. 7Z.

In some embodiments, the available actions include: (i) Activate—Override any Disabled settings for the specified field(s); (ii) Require—Require an entry in the specified field(s) in order to purchase the print item; (iii) Not Require—Override any Required settings for the specified field(s); (iv) Hide—Make the specified field(s) invisible to the end user. This also overrides any Required settings for the fields; (v) Show—Make the specified field(s) visible to the end user (overriding any Hidden settings for the fields); (vi) Enable—Allow the specified field(s) to be edited by the end user; (vii) Disable—Prevent the specified field(s) from being edited by the end user; (viii) Set—Enter a certain value in the specified field(s).

In some embodiments, after selecting an action, the administrator selects a form element (or elements) that the action will be applied to. By default, all form elements populate in the Items dropdown, but hovering over the filter icon allows specifying that only design elements, template variables, and/or other form variables should be shown (e.g., as shown in FIG. 7AA).

In the example of a completed conditional statement provided above (regarding requiring a region), the end-user will be required to select or enter his/her job title when filling out the data entry form. The user's job title will not actually print on the variable data print product, but the selection made here will determine whether the variable Region is required. As an example of the degree of control and flexibility that form variables provide: Region could be a template variable (e.g., a sales representative's region must be printed on business cards for this company, but region does not have to print on business cards for other job titles). As another example, Region could be another form variable, and a further condition could be applied. Sales representatives might only be able to select store locations or addresses within their region to print on a flyer, for example, while marketing representatives could select any location/address. The selection the sales representative made for the Region template variable could then determine how address-related template variables populated.

In some embodiments, to customize user-facing interface elements such as pagination controls, upload buttons, and validation messages, the administrator clicks the Template Custom Labels button at the top of the screen (e.g., shown in region 646, FIG. 5C). This template custom labels button is also shown in FIG. 7AB.

In some embodiments, after selecting this button, a template custom labels selection screen is displayed using a user interface such as that shown in FIG. 7AC.

In some embodiments, administrators then save a particular form configuration (e.g., all design elements, template variables, template custom labels, etc. configured for a particular template form). In some embodiments, a "Save" option is presented in the region 648 (FIG. 5C). An administrator may also, in some embodiments, copy an existing form configuration onto a new template by selecting it from the "Select existing configuration" drop-down (e.g., shown in region 648, FIG. 5C), and an example of this is shown in FIG. 7AD.

As discussed above, data libraries are lists of options that are selectable when entering variable print data for certain print on demand items. The same data library could have different options for different contacts. For example, you could have a data library of store locations, but each contact would only be able to select stores in his/her region. In some embodiments, data libraries may be manually entered via the administrative application using a user interface such as that shown in FIG. 7AE.

In some embodiments, a list of all data libraries entered in the system displays and the administrator may then select the New button to configure a new library using a user interface such as that shown in FIG. 7AF.

In some embodiments, the administrator enters a name for the library and then enters each option within this library in the Library Content field (FIG. 7AG), and each option will be listed on a separate line. In some embodiments, current contact defaults into the Contact field (e.g., "MGossage" as shown in FIG. 7AG).

In some embodiments, the administrator may also import multiple data libraries for multiple contacts, by clicking a Data Library Import/Export button at the top of the Contacts list (e.g., an example of this is shown in FIG. 7AH).

In some embodiments, the administrator then clicks Browse to select a data library spreadsheet (e.g., including three columns for (i) Username (username of contact); (ii) LibraryName (name of data library); and LibraryContent (options in library, separated by semicolons), such as the example shown in FIG. 7AI.

In some embodiments, no automatic page breaking is enforced while setting up a template form and, in this way, administrators are able to split a form up across multiple pages or allow an end-user to scroll through a single long page.

As discussed in detail below the template forms are available to end-users via a component of a print procurement application. These end-users are able to add values to the configured template forms to quickly and easily create variable print products that conform to the requirements and restrictions established by the administrator during the template form creation process discussed above.

In some embodiments, the techniques discussed above for allowing administrators to easily create highly customized template forms provide numerous technical benefits, including: (i) Large data entry forms are much more manageable because they can be broken up into multiple pages; (ii) Forms have a clean, modern-looking interface with intuitive, easy-to-use controls; (iii) Conditional display rules can be built into the form to require, default, or hide certain fields based on the user's prior input; and (iv) Data libraries can be configured so that each individual user sees only the drop-down options pertinent to his/her login when inputting variable print data. In addition to providing a user-friendly data entry experience, these techniques allow for a level of complexity and customization that allow customers to have a great degree of control over what data is incorporated into print marketing products. A form could be configured so that making a single selection (such as the store location or the user's job title) will populate all other data fields with the corresponding values, or it can be configured to allow for several pages of data entry for highly customizable forms. This prevents variable print products from being ordered incorrectly due to data entry error and also reduces the number of different variable print data products that need to be set up, allowing eCommerce sites to be configured and activated more quickly.

Figure 6:
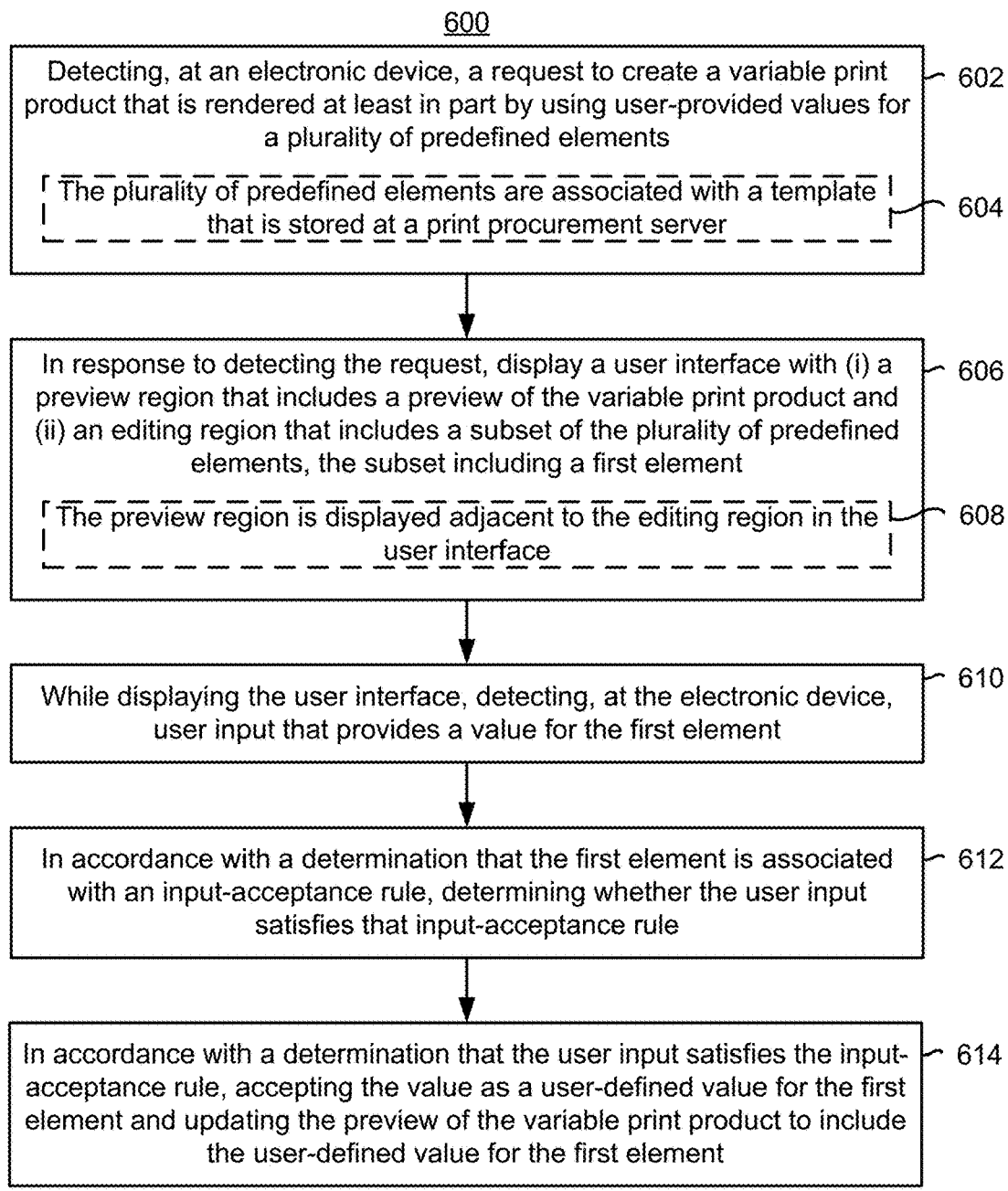
FIG. 6 is a flowchart representation of a method of efficiently rendering and producing customized versions of variable print products, in accordance with some embodiments.

FIG. 6 is a flowchart depicting a method 600 of a method of efficiently rendering and producing customized versions of variable print products, in accordance with some embodiments. FIGS. 5A-5C and 7A-7H are used to illustrate the methods and/or processes of FIG. 6. In some embodiments, each of the user interfaces presented in FIGS. 7A-7H are presented on a display of a computing device (e.g., display 208 of user computing device 102-1, as pictured for the user interface shown in FIGS. 5A). Although some of the examples which follow will be given with reference to inputs on a touch-sensitive display (e.g., of a mobile phone or a tablet device, in which a touch-sensitive surface and a display are combined), in some embodiments, the device detects inputs on a touch-sensitive surface that is separate from the display 208 (e.g., a desktop or a laptop computing device).

In some embodiments, the method 600 is performed by an electronic device (e.g., computing device 102-1, FIG. 2) and/or one or more components of the electronic device. In some embodiments, the method 600 is governed by instructions that are stored in a non-transitory computer-readable storage medium and that are executed by one or more processors of a device, such as the one or more processors 202 of device 102-1 (FIG. 2). For ease of explanation, the following describes method 600 as performed by the device 102-1. In some embodiments, with reference to FIG. 2, the operations of method 600 are performed by or use, at least in part, a web browser (e.g., web browser 220), a print procurement web application (e.g., print procurement web application 222), a print procurement application (e.g., print procurement application 224), a variable print product creation module (e.g., variable print product creation module 226), a variable print product data fetching module (e.g., variable print product data fetching module 228), and/or a display (e.g., display 208).

As described below, the method 600 provides a fast, intuitive, easy-to-use, and robust way to create customized versions of variable print products (and, in particular, ensures that an end-user is able to create a customized variable print product with a minimal number of inputs). Furthermore, allowing for the creation of customized versions of variable print products helps to efficiently use computing resources and to use only a minimal amount of memory at the client side. Moreover, the stored forms allow end-users to take advantage of extremely complex, highly customized, and easy-to-navigate interfaces to quickly create variable print products.

Referring now to FIG. 6, a computing/electronic device that is executing a print procurement application (e.g., executing locally on a computing device 102 or executing through a client-server or web-based architecture by sending information between the computing device 102 and a server 106, FIG. 1) detects (602) a request to create a variable print product that is rendered at least in part by using user-provided values for a plurality of predefined elements. In some embodiments, the predefined elements are form-creation fields or user interface objects that allow for inputting of information that is used to create the variable print product (details regarding configuration of the predefined elements is provided above in reference to FIGS. 5B-5C). In some embodiments, each of the predefined form-create elements is defined during a form creation process (see, e.g., Figures shown in Appendix A and details provided above in reference to FIGS. 5B-5C). In some embodiments, the plurality of predefined elements is associated (604) with a template that is stored at a print procurement server (e.g., servers 106, FIG. 1). In some embodiments, the stored template is available for use by authorized users, e.g., franchise owners who need access to create their own custom menus.

In response to detecting the request, the computing device displays a user interface with (606): (i) a preview region that includes a preview of the variable print product and (ii) an editing region that includes a subset of the plurality of predefined elements, the subset including a first element. An example preview region 510 is shown in FIG. 5A, as is an example editable/editing region 508. Additional examples of predefined elements that are displayed within the editing region 508 are shown in FIGS. 7A-7H, and additional examples of previews of variable print products shown in the preview region 510 are also shown in FIGS. 7A-7H. In some embodiments, the preview region is displayed (608) in a region of the user interface that is adjacent to the editing region (e.g., as shown in FIG. 5A, the editing region 508 is displayed directly to the left of the preview region 510).

While displaying the user interface, the computing device detects (610) user input that provides a value for the first element. In some circumstances, the user input corresponds to entry of text, such as entering a value for a name of an appetizer, or a price value for an appetizer, as shown in FIG. 7A. In some circumstances, the user input corresponds to selection of a radio (e.g., FIG. 7A showing radio buttons for whether to add an appetizer) or a drop-down (e.g., FIGS. 7B, 7G, and 7H, showing drop-downs that are available) option or selection of an image (e.g., FIG. 7D, showing selection of an image from a user's desktop, and FIG. 7E showing selection of an image from an image library).

In accordance with a determination that the first element is associated with an input-acceptance rule, the computing device determines (612) whether the user input (or the value for the first element) satisfies the input-acceptance rule (e.g., a rule that defines whether a particular image is acceptable, such as whether the particular image meets certain minimum requirements or a rule that defines whether a particular pricing value falls within an acceptable range of values). In accordance with a determination that the user input satisfies the input-acceptance rule, the computing device accepts (614) the value as a user-defined value for the first element and updates the preview of the variable print product to include the user-defined value for the first element.

In some embodiments, displaying the preview of the variable print product includes: identifying a portion of the variable print product that corresponds to the subset of the plurality of predefined elements; and displaying, in the first region, at least the portion of the variable print product. In other words, the preview of the variable print product that is shown in the preview region 510 is a single page of the variable print product (e.g., as shown in FIG. 7A, the preview is a preview of page 2 of the menu and the predefined elements in the editing region 508 are those that correspond to the single page).

In some embodiments, the computing device detects a user input requesting to display an additional portion of the variable print product, the additional portion including data that is associated with a second element that is not a part of the subset of the plurality of predefined elements. For example, the user input requesting to display the additional portion corresponds to selection of a "Next>" button (FIG. 7A) or may correspond to a selection of a representation of a different page (other than the page that is currently displayed in the preview region 510, such as a selection of the representation of Page 3, FIG. 7A). In response to detecting the user input requesting to display the additional portion, (i) the computing device displays, in the preview region, the additional portion of the variable print product and (ii) displays, in the editing region, the second element (e.g., the preview region is updated to show Page 3 of the menu and the editing region is updated to displayed predefined elements that correspond to Page 3, including the second element that is distinct from the first element).

In some embodiments, the second element is associated with a library of stored images. In some embodiments, the computing device detects user input at the second element (e.g., a user clicks on an upload button, FIG. 7D, or a user clicks on a select button, FIG. 7E). In response to detecting the user input at the second element, the computing device displays, in the second region, an identifier for at least one stored image from the library of stored images; and detects a selection of the identifier and, in response, updating the preview of the variable print product to include a representation of the at least one stored image (e.g., a user selects an image and a representation of that image is then shown on the displayed menu in the preview region 510).

In some embodiments, the computing device, in accordance with a determination that the user input does not satisfy the input-acceptance rule (e.g., an image does not meet acceptable requirements or a pricing value is outside of a range of values), displays an indication that the user input does not satisfy the input-acceptance rule and continuing to display the preview of the variable print product (e.g., a warning message/dialog, such as the one shown in FIG. 7F is displayed).

In some embodiments, the user interface includes a quick-fill button that, when selected, causes displaying of the preview of the variable print product using predetermined quick-fill options for at least some of the plurality of predefined elements. In some embodiments, one or more quick fill options are available (e.g., quick fill options for a dinner menu, lunch menu, breakfast menu, happy hour menu, etc.) and a user is able to select one of the quick fill options from a drop-down and then the values for the predefined elements will be auto-populated with stored values based on the selected quick fill options.

In some embodiments, the user interface includes an approve button (shown in FIGS. 7A-7H) that, when selected, causes submission of the variable print product to the print procurement server for printing of the variable print product using the user-defined values for the plurality of predefined elements. In this way, a user may simply click a single button to start a process for print out physical copies of the variable print product that they were working on.

In some embodiments, the variable print product is a restaurant menu. In some embodiments, the plurality of predefined elements are selected from the group consisting of menu items and options for inclusion on the variable print product, pricing options for inclusion on the variable print product, and image-selection options for inclusion on the variable print product (additional types of predefined elements are also discussed above in reference to FIGS. 5B-5C).

It should be understood that the particular order in which the operations in FIG. 6 have been described is merely one example and is not intended to indicate that the described order is the only order in which the operations could be performed. One of ordinary skill in the art would recognize various ways to reorder and/or combine the operations described herein. Additionally, it should be noted that other processes such as those described in can be combined with the processes described in FIG. 6 (e.g., those processes described above regarding creating template forms using an administrative application).

In some embodiments, an administrator uses an administrative component of a print procurement application in order to configure template forms (e.g., that are then used in conjunction with method 600 to allow back-). FIGS. 5B-5C (and the associated descriptions) provide additional details regarding configuring template forms.

FIGS. 8A-8B represent a system block diagram that is used to illustrate data flow operations that are used to construct and store templates and to allow users to use those templates to create variable print products, in accordance with some embodiments. In some embodiments, a first server (e.g., an InnerForm server that is a component of the print procurement servers 106, FIG. 1) stores template configuration information and quick fill data (data entries saved by end users) that are fetched by a print procurement web application (e.g., 224, FIG. 2). The first server also stores additional template-specific metadata such as image libraries and lists of values. One of skill in the art will readily appreciate how the servers and data flow operations represented in FIGS. 8A-8B are used to implement the techniques described herein.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
 at an electronic device with one or more processors and memory, wherein the electronic device is in communication with a display:
  receiving a request to create a template for generating a variable print product;
  in response to receiving the request, displaying a user interface including at least:
   (i) a preview and configuration region that includes a configurable preview of the template,
   (ii) a template variables region, distinct from the preview and configuration region, that includes one or more variables that can be selected for inclusion in the template, and
   (iii) a template custom label button;
  while displaying the user interface:
   receiving user input, in the template variables region, that selects a respective variable of the one or more variables for inclusion in the template; and
   in response to the received user input:
    (i) updating the configurable preview of the template to include the respective variable, and
    (ii) displaying user interface elements used to define one or more input-acceptance rules for the respective variable;
   receiving user input at one or more of the user interface elements to define an input-acceptance rule having at least one condition that must be satisfied before input will be accepted via the respective variable when that respective variable is used in conjunction with the template;
   in response to receiving the user input at the one or more of the user interface elements, associating the respective variable with the input-acceptance rule;

receiving user input that selects the template custom label button;

in response to receiving the user input that selects the template custom label button, displaying template custom labels elements;

receiving user input at one or more of the template custom label elements to define one or more messages; and in response to receiving the user input at one or more of the template custom label elements, associating the one or more messages with the template.

2. The method of claim 1, wherein the one or more variables are drag-able and the user input that selects the respective variable of the one or more variables includes dragging the respective variable into the configurable preview of the template.

3. The method of claim 1, wherein the user interface includes a custom region distinct from the preview and configuration region, and the template variables region; and the method further comprises, while displaying the user interface:

receiving user input to create a custom variable;

in response to receiving the user input to create the custom variable, displaying one or more customization elements used to define the custom variable including one or more input-acceptance rules for the custom variable;

receiving user input at the one or more customization elements to define the custom variable;

in response to receiving user input at the one or more customization elements to define the custom variable, including the custom variable in the custom region to be selected for inclusion in the template.

4. The method of claim 1, wherein a message of the one or more messages is a warning message.

5. The method of claim 1, wherein the at least one condition is a numerical operator selected from a group consisting of: equal to, not equal to, greater than, less than, greater than or equal to, less than or equal to, and null.

6. The method of claim 1, wherein the at least one condition includes a character limit.

7. The method of claim 1, wherein the at least one condition includes an image dimension and resolution threshold.

8. The method of claim 1, wherein the respective variable is a price; and the input-acceptance rule includes a first condition that sets a minimum value and a second condition that sets a maximum value.

9. The method of claim 1, wherein the input-acceptance rule includes at least one action that is performed after input is accepted via the respective variable when that respective variable is used in conjunction with the template.

10. The method of claim 5, wherein the at least one action is selected from a group of actions consisting of: activate, require, not require, hide, show, enable, disable, set.

11. The method of claim 5, wherein the input-acceptance rule includes an action that requires input to a distinct respective variable after input is accepted via the respective variable when that respective variable is used in conjunction with the template.

12. The method of claim 1, further comprising:

while displaying the user interface:

receiving user input to store the template; and in response to receiving user input to store the template, storing the template at a print procurement server.

13. The method of claim 1, wherein the request to create the template for generating the variable print product is received by an administrator of a corporation and the input-acceptance rule associated with the respective variable must be satisfied by input from a franchisee when that respective variable is used in conjunction with the template.

14. A non-transitory computer-readable storage medium storing executable instructions that, when executed by an electronic device that is in communication with a display, cause the electronic device to:

receive a request to create a template for generating a variable print product;

in response to receiving the request, display a user interface including at least:

(i) a preview and configuration region that includes a configurable preview of the template, (ii) a template variables region, distinct from the preview and configuration region, that includes one or more variables that can be selected for inclusion in the template, and (iii) a template custom label button;

while displaying the user interface:

receive user input, in the template variables region, that selects a respective variable of the one or more variables for inclusion in the template; and in response to the received user input:

(i) update the configurable preview of the template to include the respective variable, and (ii) display user interface elements used to define one or more input-acceptance rules for the respective variable;

receive user input at one or more of the user interface elements to define an input-acceptance rule having at least one condition that must be satisfied before input will be accepted via the respective variable when that respective variable is used in conjunction with the template;

in response to receiving the user input at the one or more of the user interface elements, associate the respective variable with the input-acceptance rule;

receive user input that selects the template custom label button;

in response to receiving the user input that selects the template custom label button, display template custom label elements;

receive user input at one or more of the template custom label elements to define one or more messages; and in response to receiving the user input at one or more of the template custom label elements, associate the one or more messages with the template.

15. The storage medium of claim 14, wherein the one or more variables are drag-able and the user input that selects the respective variable of the one or more variables includes dragging the respective variable into the configurable preview of the template.

16. The storage medium of claim 14, wherein the user interface includes a custom region distinct from the preview and configuration region, and the template variables region; and the instructions, when executed by an electronic device, further cause the electronic device to, while displaying the user interface:

receive user input to create a custom variable;

in response to receiving the user input to create the custom variable, display one or more customization elements used to define the custom variable including one or more input-acceptance rules for the custom variable;
receive user input at the one or more customization elements to define the custom variable;
in response to receiving user input at the one or more customization elements to define the custom variable, include the custom variable in the custom region to be selected for inclusion in the template.

17. A non-transitory computer-readable storage medium storing executable instructions that, when executed by an electronic device that is in communication with a display, cause the electronic device to:
receive a request to create a template for generating a variable print product;
in response to receiving the request, display a user interface including at least:
(i) a preview and configuration region that includes a configurable preview of the template,
(ii) a template variables region, distinct from the preview and configuration region, that includes one or more variables that can be selected for inclusion in the template, and
(iii) a custom region distinct from the preview and configuration region, and the template variables region;
while displaying the user interface:
receive user input, in the template variables region, that selects a respective variable of the one or more variables for inclusion in the template; and
in response to the received user input:
(i) update the configurable preview of the template to include the respective variable, and
(ii) display user interface elements used to define one or more input-acceptance rules for the respective variable;
receive user input at one or more of the user interface elements to define an input-acceptance rule having at least one condition that must be satisfied before input will be accepted via the respective variable when that respective variable is used in conjunction with the template;
in response to receiving the user input at the one or more of the user interface elements, associate the respective variable with the input-acceptance rule;
receive user input to create a custom variable;
in response to receiving the user input to create the custom variable, display one or more customization elements used to define the custom variable including one or more input-acceptance rules for the custom variable;
receive user input at the one or more customization elements to define the custom variable; and
in response to receiving user input at the one or more customization elements to define the custom variable, include the custom variable in the custom region to be selected for inclusion in the template.

18. The storage medium of claim 17, wherein the one or more variables are drag-able and the user input that selects the respective variable of the one or more variables includes dragging the respective variable into the configurable preview of the template.

19. The storage medium of claim 17, wherein the user interface includes a template custom label button; and
the instructions, when executed by an electronic device, further cause the electronic device to, while displaying the user interface:
receive user input that selects the template custom label button;
in response to receiving the user input that selects the template custom label button, display template custom labels elements;
receive user input at one or more of the template custom labels elements to define one or more messages; and
in response to receiving the user input at one or more of the template custom labels elements, associate the one or more messages with the respective variable.

20. The storage medium of claim 19, wherein a message of the one or more messages is a warning message.

21. The storage medium of claim 17, wherein the at least one condition is a numerical operator selected from a group consisting of: equal to, not equal to, greater than, less than, greater than or equal to, less than or equal to, and null.

22. The storage medium of claim 17, wherein the at least one condition includes a character limit.

23. A method, comprising:
at an electronic device with one or more processors and memory, wherein the electronic device is in communication with a display:
receiving a request to create a template for generating a variable print product;
in response to receiving the request, displaying a user interface including at least:
(i) a preview and configuration region that includes a configurable preview of the template,
(ii) a template variables region, distinct from the preview and configuration region, that includes one or more variables that can be selected for inclusion in the template, and
(iii) a custom region distinct from the preview and configuration region, and the template variables region;
while displaying the user interface:
receiving user input, in the template variables region, that selects a respective variable of the one or more variables for inclusion in the template; and
in response to the received user input:
(i) updating the configurable preview of the template to include the respective variable, and
(ii) displaying user interface elements used to define one or more input-acceptance rules for the respective variable;
receiving user input at one or more of the user interface elements to define an input-acceptance rule having at least one condition that must be satisfied before input will be accepted via the respective variable when that respective variable is used in conjunction with the template;
in response to receiving the user input at the one or more of the user interface elements, associating the respective variable with the input-acceptance rule;
receiving user input to create a custom variable;
in response to receiving the user input to create the custom variable, displaying one or more customization elements used to define the custom variable including one or more input-acceptance rules for the custom variable;
receiving user input at the one or more customization elements to define the custom variable; and
in response to receiving user input at the one or more customization elements to define the custom variable, including the custom variable in the custom region to be selected for inclusion in the template.

24. The method of claim 23, wherein the user interface includes a template custom label button; and the method further comprises, while displaying the user interface:

receiving user input that selects the template custom label button;

in response to receiving the user input that selects the template custom label button, displaying template custom labels elements;

receiving user input at one or more of the template custom labels elements to define one or more messages; and in response to receiving the user input at one or more of the template custom labels elements, associating the one or more messages with the respective variable.

25. The method of claim 24, wherein a message of the one or more messages is a warning message.

26. The method of claim 23, wherein the one or more variables are drag-able and the user input that selects the respective variable of the one or more variables includes dragging the respective variable into the configurable preview of the template.

27. The method of claim 23, wherein the at least one condition is a numerical operator selected from a group consisting of: equal to, not equal to, greater than, less than, greater than or equal to, less than or equal to, and null.

28. The method of claim 23, wherein the at least one condition includes a character limit.

* * * * *